US011445408B2

(12) United States Patent
Li et al.

(10) Patent No.: US 11,445,408 B2
(45) Date of Patent: Sep. 13, 2022

(54) HIGH PATHLOSS MODE MULTIPLEXING

(71) Applicant: QUALCOMM incorporated, San Diego, CA (US)

(72) Inventors: Junyi Li, Chester, NJ (US); Juergen Cezanne, Ocean Township, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/806,731

(22) Filed: Mar. 2, 2020

(65) Prior Publication Data
US 2020/0336942 A1 Oct. 22, 2020

Related U.S. Application Data

(60) Provisional application No. 62/835,426, filed on Apr. 17, 2019.

(51) Int. Cl.
*H04W 40/00* (2009.01)
*H04W 4/00* (2018.01)
(Continued)

(52) U.S. Cl.
CPC .......... *H04W 28/16* (2013.01); *H04W 84/047* (2013.01); *H04W 88/085* (2013.01)

(58) Field of Classification Search
CPC ......... H04W 28/0215; H04W 28/0247; H04W 72/0453; H04W 72/04; H04W 52/242;
(Continued)

(56) References Cited

U.S. PATENT DOCUMENTS 7,016,649 B1 3/2006 Narasimhan et al.
8,327,002 B1 12/2012 Van Dussen et al.
(Continued)

FOREIGN PATENT DOCUMENTS

EP 1515471 A1 3/2005
EP 2120364 A1 11/2009
(Continued)

OTHER PUBLICATIONS

QUALCOMM Incorporated: "Resource Allocation for PUCCH", 3GPP Draft, 3GPP TSG RAN WG1 Meeting #90b, R1-1718806 Resource Allocation for PUCCH, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017, XP051341951, 10 pages, Retrieved from the Internet: URL: http://www.3gpp.org/ftp/Meetings_3GPP_SYNC/RAN1/Docs/, [retrieved on Oct. 8, 2017], paragraph [0002].
(Continued)

*Primary Examiner* — Mark G. Pannell
(74) *Attorney, Agent, or Firm* — Holland & Hart LLP/Qualcomm Incorporated

(57) ABSTRACT

Methods, systems, and devices for wireless communications are described. A wireless device may configure one or more first sets of resources of a radio frequency spectrum band associated with a first pathloss mode, and may configure one or more second sets of resources associated with a second pathloss mode. Each set of resources may be configured with some transmission timing parameters and frame structure, such that a transmission time interval (TTI) associated with the first pathloss mode may be different from the TTI associated with the second pathloss mode. The wireless device may communicate with a second wireless device using the one or more first sets of resources based on
(Continued)

identifying a pathloss value is below an identified pathloss threshold. Additionally, the wireless device may communicate with a third device using the one or more second sets of resources based on identifying a pathloss value satisfies the identified pathloss threshold.

47 Claims, 21 Drawing Sheets

(51) Int. Cl.
  H04W 28/16 (2009.01)
  H04W 88/08 (2009.01)
  H04W 84/04 (2009.01)
(58) Field of Classification Search
  CPC . H04W 28/16; H04W 84/047; H04W 88/085; H04L 25/03955
  USPC .......................................................... 455/446
  See application file for complete search history.

(56) References Cited

U.S. PATENT DOCUMENTS

| | | | |
|---|---|---|---|
| 9,319,886 | B2 | 4/2016 | Jo et al. |
| 9,877,322 | B1* | 1/2018 | Sung ................ H04W 72/0446 |
| 10,736,054 | B2 | 8/2020 | Jiang et al. |
| 2005/0106910 | A1* | 5/2005 | Chiu .................... H01R 12/714 439/136 |
| 2006/0285504 | A1 | 12/2006 | Dong et al. |
| 2008/0268786 | A1 | 10/2008 | Baker et al. |
| 2009/0046653 | A1 | 2/2009 | Singh et al. |
| 2009/0210474 | A1 | 8/2009 | Shao et al. |
| 2010/0113041 | A1 | 5/2010 | Bienas et al. |
| 2010/0329195 | A1* | 12/2010 | Abraham .............. H04W 52/42 370/329 |
| 2010/0331030 | A1 | 12/2010 | Nory et al. |
| 2011/0085502 | A1 | 4/2011 | Malladi |
| 2011/0249578 | A1 | 10/2011 | Nayeb Nazar et al. |
| 2012/0157108 | A1* | 6/2012 | Boudreau .............. H04J 11/005 455/450 |
| 2013/0003788 | A1 | 1/2013 | Marinier et al. |
| 2013/0265916 | A1 | 10/2013 | Zhu et al. |
| 2013/0301454 | A1 | 11/2013 | Seol et al. |
| 2014/0071954 | A1 | 3/2014 | Au et al. |
| 2014/0098761 | A1 | 4/2014 | Lee et al. |
| 2014/0105136 | A1* | 4/2014 | Tellado ............... H04W 52/146 370/329 |
| 2014/0206382 | A1 | 7/2014 | Shabtay |
| 2014/0254537 | A1* | 9/2014 | Kim ..................... H04L 5/0053 370/329 |
| 2014/0274141 | A1* | 9/2014 | Gholmieh ............. H04W 64/00 455/456.3 |
| 2014/0362716 | A1 | 12/2014 | Zhang et al. |
| 2015/0011236 | A1 | 1/2015 | Kazmi et al. |
| 2015/0365939 | A1 | 12/2015 | Zhang et al. |
| 2016/0066301 | A1* | 3/2016 | Zhu ........................ H04L 43/16 370/329 |
| 2016/0088648 | A1 | 3/2016 | Xue et al. |
| 2016/0270116 | A1 | 9/2016 | Lin et al. |
| 2016/0295595 | A1* | 10/2016 | Chae ...................... H04W 4/80 |
| 2016/0308280 | A1 | 10/2016 | Shimizu |
| 2016/0315686 | A1 | 10/2016 | Song et al. |
| 2017/0034837 | A1 | 2/2017 | Lopez-Perez et al. |
| 2017/0070961 | A1 | 3/2017 | Bharadwaj et al. |
| 2017/0086080 | A1 | 3/2017 | Sun et al. |
| 2017/0093038 | A1 | 3/2017 | Li et al. |
| 2017/0215201 | A1 | 7/2017 | Kim et al. |
| 2017/0265169 | A1 | 9/2017 | Chen et al. |
| 2017/0290008 | A1 | 10/2017 | Tooher et al. |
| 2017/0310426 | A1 | 10/2017 | Fan et al. |
| 2017/0325164 | A1 | 11/2017 | Lee et al. |
| 2018/0020452 | A1 | 1/2018 | Yerramalli et al. |
| 2018/0042031 | A1 | 2/2018 | Hampel et al. |
| 2018/0049137 | A1 | 2/2018 | Li et al. |
| 2018/0054339 | A1* | 2/2018 | Sun ......................... H04L 27/20 |
| 2018/0092073 | A1 | 3/2018 | Nogami et al. |
| 2018/0124790 | A1 | 5/2018 | Yerramalli |
| 2018/0132197 | A1 | 5/2018 | Lin et al. |
| 2018/0145798 | A1 | 5/2018 | Suzuki et al. |
| 2018/0145819 | A1* | 5/2018 | Axmon ..................... H04L 5/16 |
| 2018/0198181 | A1 | 7/2018 | Fukasawa |
| 2018/0220465 | A1* | 8/2018 | Zhang ....................... H04L 1/00 |
| 2018/0234337 | A1 | 8/2018 | Goliya et al. |
| 2018/0242264 | A1 | 8/2018 | Pelletier et al. |
| 2018/0249492 | A1 | 8/2018 | Xu et al. |
| 2018/0324716 | A1 | 11/2018 | Jeon et al. |
| 2018/0324853 | A1 | 11/2018 | Jeon et al. |
| 2018/0367263 | A1 | 12/2018 | Ying et al. |
| 2018/0375619 | A1 | 12/2018 | Hwang et al. |
| 2019/0007181 | A1 | 1/2019 | Marinier et al. |
| 2019/0044639 | A1 | 2/2019 | Ouchi et al. |
| 2019/0044647 | A1 | 2/2019 | Tomeba et al. |
| 2019/0053072 | A1 | 2/2019 | Kundargi et al. |
| 2019/0053205 | A1 | 2/2019 | Tomeba et al. |
| 2019/0082457 | A1 | 3/2019 | Zhou et al. |
| 2019/0089498 | A1 | 3/2019 | Pelletier et al. |
| 2019/0116605 | A1 | 4/2019 | Luo et al. |
| 2019/0182870 | A1 | 6/2019 | Shih et al. |
| 2019/0208538 | A1 | 7/2019 | Lee et al. |
| 2019/0215766 | A1 | 7/2019 | Wu et al. |
| 2019/0215896 | A1 | 7/2019 | Zhou et al. |
| 2019/0253136 | A1 | 8/2019 | Makki et al. |
| 2019/0260495 | A1 | 8/2019 | Nammi |
| 2019/0288765 | A1 | 9/2019 | Lee et al. |
| 2019/0313406 | A1* | 10/2019 | Liu ................... H04W 72/0446 |
| 2019/0327123 | A1* | 10/2019 | Wang .................. H04J 11/0079 |
| 2020/0015209 | A1 | 1/2020 | Zhang |
| 2020/0107335 | A1 | 4/2020 | Xue et al. |
| 2020/0107355 | A1 | 4/2020 | Zhou |
| 2020/0145860 | A1 | 5/2020 | Koskela et al. |
| 2020/0146059 | A1 | 5/2020 | Cirik et al. |
| 2020/0288409 | A1 | 9/2020 | Li |
| 2020/0296673 | A1 | 9/2020 | Ouchi et al. |
| 2020/0328850 | A1 | 10/2020 | Feng |
| 2020/0336920 | A1 | 10/2020 | Li et al. |
| 2020/0336946 | A1 | 10/2020 | Li et al. |
| 2020/0336994 | A1 | 10/2020 | Li et al. |
| 2020/0337004 | A1 | 10/2020 | Li et al. |
| 2020/0337028 | A1 | 10/2020 | Li et al. |
| 2021/0022091 | A1 | 1/2021 | Li et al. |
| 2021/0037441 | A1 | 2/2021 | Khalid et al. |
| 2021/0136639 | A1 | 5/2021 | Osawa |
| 2021/0168782 | A1 | 6/2021 | Hamidi-Sepehr et al. |
| 2021/0195674 | A1 | 6/2021 | Park et al. |
| 2021/0204307 | A1 | 7/2021 | Lee et al. |

FOREIGN PATENT DOCUMENTS

| | | |
|---|---|---|
| EP | 2504942 A1 | 10/2012 |
| EP | 3179660 A1 | 6/2017 |
| KR | 20180136855 A | 12/2018 |
| WO | WO-2016040290 A1 | 3/2016 |
| WO | WO-2019070579 A1 | 4/2019 |

OTHER PUBLICATIONS

International Search Report and Written Opinion—PCT/US2020/020808—ISA/EPO—dated May 29, 2020 (192018WO).
AT&T: "Enhancements to Support NR Backhaul Links," 3GPP Draft, 3GPP TSG RAN WG1 Meeting #94bis, R1-1810690, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051518094, 15 pages, Retrieved from the Internet: URL: http://www.3gpp.org/ftp/tsg_ran/WG1_RL1/TSGR1_94b/Docs/R1-1810690.zip [retrieved on Sep. 29, 2018] Chapter 2.3 "Frame Structure Design and Backhaul Multiplexing".
Huawei, et al., "Physical Layer Enhancement on IAB", 3GPP TSG-RAN WG1 Meeting #92bis, 3GPP Draft; R1-1803695, 3rd

(56) References Cited

OTHER PUBLICATIONS

Generation Partnership Project (3GPP), Mobile Competence Centre; 650, Route Des Lucioles; F-06921 Sophia-Antipolis Cedex; France, vol. Ran WG1, No. Sanya, China; Apr. 16, 2018-Apr. 20, 2018, Apr. 15, 2018 (Apr. 15, 2018), 6 Pages, XP051425992, Retrieved from the Internet: URL: http://www.3gpp.org/ftp/Meetings%5F3GPP%5FSYNC/RAN1/Docs/ [retrieved on Apr. 15, 2018] Sections 2.1 and 2.2.

LG Electronics: "Discussions on Mechanisms to Support NR IAB Scenarios," 3GPP Draft, 3GPP TSG RAN WG1 Meeting #94bis, R1-1810273, Discussions on NR IAB Support_V0, 3rd Generation Partnership Project, (3gpp), Mobile Competence Centre ; 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051517687, 7 pages, Retrieved from the Internet: URL: http://www.3gpp.org/ftp/tsg%5Fran/WG1%5FRL1/TSGR1%5F94b/Docs/R1%2D1810273%2Ezip [retrieved on Sep. 29, 2018] Chapter 6 "Access and backhaul Timing," Chapter 7 "TDM Patterns".

Qualcomm Incorporated: "Inter-IAB-Node Discovery", 3GPP Draft, 3GPP TSG RAN WG1 Meeting #93, R1-1807395, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 12, 2018 (May 12, 2018), XP051463086, 8 Pages, Retrieved from the Internet: URL: http://www.3gpp.org/ftp/tsg%5Fran/WG1%5FRL1/TSGR1%5F93/Docs, [retrieved on May 12, 2018], paragraph [0003].

\* cited by examiner

HIGH PATHLOSS MODE MULTIPLEXING

CROSS REFERENCE

The present application for patent claims the benefit of U.S. Provisional Patent Application No. 62/835,426 by LI et al., entitled "HIGH PATHLOSS MODE MULTIPLEXING," filed Apr. 17, 2019, assigned to the assignee hereof, and expressly incorporated herein.

INTRODUCTION

The following relates to wireless communications, and more specifically to multiplexing communications for wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple access communications system may include a number of base stations or network access nodes, each simultaneously supporting communication for multiple communication devices, which may be otherwise known as user equipment (UE).

SUMMARY

A method of wireless communications at a first wireless device is described. The method may include configuring one or more first sets of resources of a radio frequency spectrum band for communications associated with a first pathloss mode, configuring one or more second sets of resources of the radio frequency spectrum band for communications associated with a second pathloss mode, where a first length of a first transmission time interval (TTI) associated with the first pathloss mode is different from a second length of a second TTI associated with the second pathloss mode, communicating with a second wireless device operating in the first pathloss mode via the one or more first sets of resources, and communicating with a third wireless device operating in the second pathloss mode via the one or more second sets of resources.

An apparatus for wireless communications at a first wireless device is described. The apparatus may include a processor and memory coupled to the processor. The memory and processor may be further configured to cause the apparatus to configure one or more first sets of resources of a radio frequency spectrum band for communications associated with a first pathloss mode, configure one or more second sets of resources of the radio frequency spectrum band for communications associated with a second pathloss mode, where a first length of a first TTI associated with the first pathloss mode is different from a second length of a second TTI associated with the second pathloss mode, communicate with a second wireless device operating in the first pathloss mode via the one or more first sets of resources, and communicate with a third wireless device operating in the second pathloss mode via the one or more second sets of resources.

Another apparatus for wireless communications at a first wireless device is described. The apparatus may include means for configuring one or more first sets of resources of a radio frequency spectrum band for communications associated with a first pathloss mode, configuring one or more second sets of resources of the radio frequency spectrum band for communications associated with a second pathloss mode, where a first length of a first TTI associated with the first pathloss mode is different from a second length of a second TTI associated with the second pathloss mode, communicating with a second wireless device operating in the first pathloss mode via the one or more first sets of resources, and communicating with a third wireless device operating in the second pathloss mode via the one or more second sets of resources.

A non-transitory computer-readable medium storing code for wireless communications at a first wireless device is described. The code may include instructions executable by a processor to configure one or more first sets of resources of a radio frequency spectrum band for communications associated with a first pathloss mode, configure one or more second sets of resources of the radio frequency spectrum band for communications associated with a second pathloss mode, where a first length of a first TTI associated with the first pathloss mode is different from a second length of a second TTI associated with the second pathloss mode, communicate with a second wireless device operating in the first pathloss mode via the one or more first sets of resources, and communicate with a third wireless device operating in the second pathloss mode via the one or more second sets of resources.

Some examples of the method, apparatuses, and non-transitory computer-readable medium described herein may further include operations, features, means, or instructions for configuring a first subset of a set of communication links supported by the first wireless device for the first pathloss mode, and configuring a second subset of the set of communication links supported by the first wireless device for the second pathloss mode.

Some examples of the method, apparatuses, and non-transitory computer-readable medium described herein may further include operations, features, means, or instructions for identifying a pathloss associated with the first subset of the set of communication links, where the first subset of the set of communication links may be configured based on the identified pathloss.

In some examples of the method, apparatuses, and non-transitory computer-readable medium described herein, the one or more first sets of resources may be associated with a first set of time resources and a first set of frequency resources, and the one or more second sets of resources may be associated with at least a portion of the first set of time resources and a second set of frequency resources different from the first set of frequency resources.

In some examples of the method, apparatuses, and non-transitory computer-readable medium described herein, the one or more first sets of resources may be associated with a first set of time resources and a first set of frequency resources, and the one or more second sets of resources may be associated with a second set of time resources different from the first set of time resources and at least a portion of the first set of frequency resources.

In some examples of the method, apparatuses, and non-transitory computer-readable medium described herein, the one or more first sets of resources may be associated with a first set of time resources and a first set of frequency resources, and the one or more second sets of resources may be associated with a second set of time resources different from the first set of time resources and a second set of frequency resources different from the first set of frequency resources.

In some examples of the method, apparatuses, and non-transitory computer-readable medium described herein, the one or more first sets of resources and the one or more second sets of resources may be the same.

Some examples of the method, apparatuses, and non-transitory computer-readable medium described herein may further include operations, features, means, or instructions for communicating with the second wireless device according to a first spatial stream, and communicating with the third wireless device according to a second spatial stream different from the first spatial stream.

Some examples of the method, apparatuses, and non-transitory computer-readable medium described herein may further include operations, features, means, or instructions for communicating with the second wireless device operating in the first pathloss mode via a first communication link associated with the one or more first sets of resources, where the first communication link may be configured for one of transmission or reception, and communicating with the third wireless device operating in the second pathloss mode via a second communication link associated with the one or more second sets of resources, where the second communication link may be configured for one of transmission or reception independent of the first communication link.

Some examples of the method, apparatuses, and non-transitory computer-readable medium described herein may further include operations, features, means, or instructions for configuring a set of gaps for communications of the first pathloss mode via the one or more first sets of resources, configuring a set of TTIs for communications of the second pathloss mode via the one or more second sets of resources, and synchronizing the set of gaps corresponding to the first pathloss mode with the set of TTIs corresponding to the second pathloss mode.

Some examples of the method, apparatuses, and non-transitory computer-readable medium described herein may further include operations, features, means, or instructions for transmitting a gap structure associated with the set of gaps, where the gap structure indicates respective locations and lengths corresponding to the set of gaps.

Some examples of the method, apparatuses, and non-transitory computer-readable medium described herein may further include operations, features, means, or instructions for transmitting the gap structure via a slot format indicator (SFI).

Some examples of the method, apparatuses, and non-transitory computer-readable medium described herein may further include operations, features, means, or instructions for configuring a first set of gaps, a first set of TTIs associated with transmission, and a first set of TTIs associated with reception for communications of the first pathloss mode via the one or more first sets of resources, configuring a second set of gaps, a second set of TTIs associated with transmission, and a second set of TTIs associated with reception for communications of the second pathloss mode via the one or more second sets of resources, and synchronizing the first and the second sets of gaps, the first and the second sets of TTIs associated with transmission, and the first and the second sets of TTIs associated with reception.

Some examples of the method, apparatuses, and non-transitory computer-readable medium described herein may further include operations, features, means, or instructions for transmitting a gap structure indicating respective locations and lengths for one or more gaps of the first set of gaps or the second set of gaps, or both.

In some examples of the method, apparatuses, and non-transitory computer-readable medium described herein, the first pathloss mode may be a high pathloss mode and the second pathloss mode may be a normal mode.

In some examples of the method, apparatuses, and non-transitory computer-readable medium described herein, the first, second, and third wireless devices may be integrated access and backhaul (IAB) nodes operating in an IAB network.

A method of wireless communications at a first wireless device is described. The method may include configuring one or more sets of resources of a radio frequency spectrum band for communications associated with a first pathloss mode, where a first length of a first TTI associated with the first pathloss mode is different from a second length of a second TTI associated with a second pathloss mode and communicating with a second wireless device in the first pathloss mode using a communication link via the one or more sets of resources.

An apparatus for wireless communications at a first wireless device is described. The apparatus may include a processor and memory coupled to the processor. The memory and the processor further configured to cause the apparatus to configure one or more sets of resources of a radio frequency spectrum band for communications associated with a first pathloss mode, where a first length of a first TTI associated with the first pathloss mode is different from a second length of a second TTI associated with a second pathloss mode and communicate with a second wireless device in the first pathloss mode using a communication link via the one or more sets of resources.

Another apparatus for wireless communications at a first wireless device is described. The apparatus may include means for configuring one or more sets of resources of a radio frequency spectrum band for communications associated with a first pathloss mode, where a first length of a first TTI associated with the first pathloss mode is different from a second length of a second TTI associated with a second pathloss mode and communicating with a second wireless device in the first pathloss mode using a communication link via the one or more sets of resources.

A non-transitory computer-readable medium storing code for wireless communications at a first wireless device is described. The code may include instructions executable by a processor to configure one or more sets of resources of a radio frequency spectrum band for communications associated with a first pathloss mode, where a first length of a first TTI associated with the first pathloss mode is different from a second length of a second TTI associated with a second pathloss mode and communicate with a second wireless device in the first pathloss mode using a communication link via the one or more sets of resources.

Some examples of the method, apparatuses, and non-transitory computer-readable medium described herein may further include operations, features, means, or instructions for configuring one or more second sets of resources of the radio frequency spectrum band for communications associated with the second pathloss mode, and communicating with the second wireless device in the second pathloss mode using a second communication link via the one or more second sets of resources.

Some examples of the method, apparatuses, and non-transitory computer-readable medium described herein may further include operations, features, means, or instructions for receiving, from the second wireless device, an indication to switch from the first pathloss mode to the second pathloss mode, and communicating with the second wireless device in the second pathloss mode based on the indication.

In some examples of the method, apparatuses, and non-transitory computer-readable medium described herein, the one or more first sets of resources may be associated with a first set of time resources and a first set of frequency resources, and the one or more second sets of resources may be associated with at least a portion of the first set of time resources and a second set of frequency resources different from the first set of frequency resources.

In some examples of the method, apparatuses, and non-transitory computer-readable medium described herein, the one or more first sets of resources may be associated with a first set of time resources and a first set of frequency resources, and the one or more second sets of resources may be associated with a second set of time resources different from the first set of time resources and at least a portion of the first set of frequency resources.

In some examples of the method, apparatuses, and non-transitory computer-readable medium described herein, the one or more first sets of resources may be associated with a first set of time resources and a first set of frequency resources, and the one or more second sets of resources may be associated with a second set of time resources different from the first set of time resources and a second set of frequency resources different from the first set of frequency resources.

In some examples of the method, apparatuses, and non-transitory computer-readable medium described herein, the one or more first sets of resources and the one or more second sets of resources may be the same.

Some examples of the method, apparatuses, and non-transitory computer-readable medium described herein may further include operations, features, means, or instructions for receiving, from the second wireless device, a gap structure associated with one or more gaps for the first pathloss mode, where the gap structure indicates respective locations and lengths corresponding to the one or more gaps, and communicating with the second wireless device based on the gap structure.

Some examples of the method, apparatuses, and non-transitory computer-readable medium described herein may further include operations, features, means, or instructions for receiving the gap structure via an SFI.

DETAILED DESCRIPTION

Figure 1:
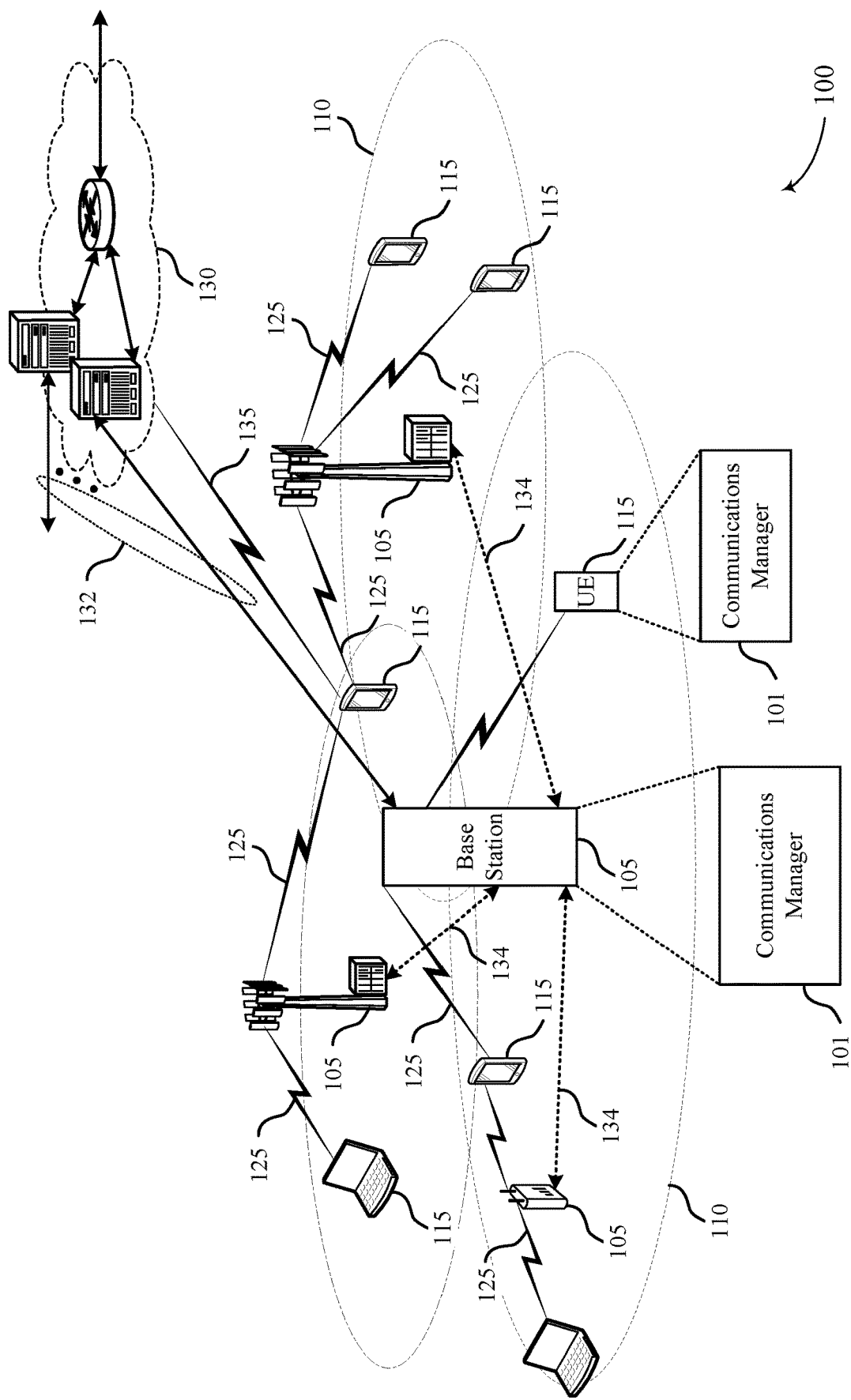
FIGS. 1-3 illustrate examples of a wireless communications system that supports communication configuration for high pathloss operations in accordance with one or more aspects of the present disclosure.

Wireless communications systems may operate in frequency ranges (e.g., millimeter wave (mmW) frequencies) associated with increased signal attenuation (e.g., pathloss) as a result of various factors such as temperature, blockage or interference, weather conditions, diffraction, free-space losses or the like. A number of signal processing and beamforming techniques may be used to coherently combine signals and overcome pathloss in such frequency ranges. For example, one or more wireless devices or wireless nodes may operate in a high pathloss mode in cases where a pathloss value for the system satisfies or exceeds a threshold pathloss value (e.g., 20-30 decibels (dB) higher than the pathloss in normal operation). Operating in a high pathloss mode may allow the device to satisfy reliability standards and maintain a target link budget in some environments (such as those prone to high pathlosses). High pathloss mode operations, however, may increase the transmission duration of signals along with the transmission timing of some control and data channels, and may restrict operation on narrow communication bandwidths and over extended (e.g., several) TTIs. Alternatively, the wireless devices or wireless nodes may operate in a normal pathloss mode (e.g., a low pathloss mode) in cases where the pathloss value is below the threshold pathloss value.

In an example of an integrated access and backhaul (IAB) network, a number of nodes may communicate using a number of wireless links. Each node pair may communicate using a mode of operation (e.g., a high pathloss mode or a normal mode) depending on, for example, whether the pathloss between the node pair exceeds a pathloss threshold, or depending on other network conditions. In some examples, the node pair may switch between operations in a high pathloss mode and operations in a normal mode, or may carry out communication between nodes operating in both a high pathloss mode and a normal mode.

In some cases, a first wireless node may communicate with a number of secondary nodes over a set of wireless links. In some examples, a first subset of the wireless links may experience pathloss while other wireless links may not experience such losses (or may experience minimal pathloss compared to the first subset of wireless links). The first wireless node may therefore employ a high pathloss mode for communications using the first subset of links and may maintain normal mode operation for the other wireless links. In some cases, a first wireless node may communicate with a second node using a first mode of operation (e.g., a high pathloss mode), and may communicate with a third node using a second mode of operation (e.g., a normal mode).

In some aspects, the first wireless node may communicate with a number of other wireless nodes using different or multiple modes of operation. In some cases, the first node may switch between modes for communicating with the second node (in high pathloss mode) and the third node (in normal mode), however, switching may cause delay and may add complexity, which may result in inefficiencies where the entire network is configured to perform mode switching. The first wireless node may instead employ techniques for maintaining communication over the links using both high pathloss mode and normal modes. Such techniques may allow a portion of a connected IAB network to operate in a high pathloss mode while the rest of the IAB network operates in a normal mode.

Methods in a wireless network that multiplex high pathloss mode and normal mode communications between nodes may support communications in a number of cases. In some examples, a network may use frequency-division multiplexing (FDM) or time division multiplexing (TDM), where frequency or time partitioning may be performed deterministically. Other possible multiplexing schemes include space-division multiplexing (SDM), among others. In cases where a network uses FDM methods, the network may partition a bandwidth into a number of different frequency components that may be allocated for different modes of communication (e.g., a high pathloss mode or a normal mode).

In some cases, communications in the wireless network may be subject to a number of network constraints. For example, communication between nodes may be restricted to half-duplex communications, or communication between nodes may not be restricted, and may operate in full-duplex mode. In cases where a half-duplex constraint applies, communications using both high pathloss and normal modes may be synchronized according to a system frame structure. For a normal mode, a slot may contain both a transmission period and a reception period, where a node may transmit or receive data using the normal mode during the allocated transmission or reception periods. To accommodate communications using the normal mode, and to further accommodate the conditions of half-duplex, a node may transmit using a high pathloss mode during times allocated for normal mode transmissions, but may not transmit using a high pathloss mode during times allocated for normal mode reception. As such, the system frame structure may contain a number of gaps in the high pathloss mode band to synchronize high pathloss mode transmission periods with normal mode transmission periods.

To achieve slot format synchronization, a first node may transmit an SFI or other control information in a bandwidth part (BWP) associated with the high pathloss mode. The SFI may contain some frame structure information, such as the location and duration of gaps between transmission units for operations in a normal mode during a given TTI. The gap structure indicated in the SFI of the high pathloss mode may depend on the slot format of the multiplexed normal mode, and the slot format information of the normal mode may be included in the SFI. In some cases, a number of SFIs may be used to indicate changes in network frame structure or gap structure between transmissions, which may resynchronize the slot format. For example, the first node may transmit a first SFI to indicate a first transmission gap structure for a high pathloss mode. The first node may transmit a second SFI to indicate a second transmission gap structure or a change in transmission gap structure of the high pathloss mode. In some cases, such SFI signaling may re-synchronize the frame structure and associated communications for the wireless nodes.

Aspects of the disclosure are initially described in the context of wireless communications systems. Aspects are then described with respect to configuration parameters, radio frequency spectrum bands, and a process flow. Aspects of the disclosure are further illustrated by and described with reference to apparatus diagrams, system diagrams, and flowcharts that relate to high pathloss mode multiplexing.

FIG. 1 illustrates an example of a wireless communications system 100 that supports high pathloss mode multiplexing in accordance with one or more aspects of the present disclosure. The wireless communications system 100 includes base stations 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). In some cases, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 kilometers (km)) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM.

The organizational structure of the carriers may be different for different radio access technologies (RATs) such as LTE, LTE-A, LTE-A Pro, NR, etc. For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using TDM techniques, FDM techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous or concurrent communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The nature of propagation paths between devices in wireless communications system 100 may vary due to a number of factors including interference, hidden nodes, weather conditions, blockage, and the like. In such cases, wireless devices may attempt to overcome pathloss to ensure ongoing communication, and may communicate accordingly in response to changes in propagation path or pathloss. For example, a base station 105 and a set of UEs 115 in the network may communicate over a set of wireless links. In some cases, a subset of the wireless links may experience higher pathloss while the remaining wireless links may not experience such losses or may experience a lower pathloss compared to the remaining subset of the wireless links. To improve communications, devices may employ a high pathloss mode for the first subset of links while maintaining normal mode operation for the rest of the communications links.

One or more UEs 115 or base stations 105 may include a communications manager 101 for managing communications according to different pathloss modes. For example, a communications manager 101 may be used to configure one or more first sets of resources (e.g., time and frequency resources) associated with a normal mode of communication, and a second set or resources associated with a high pathloss mode of communication. Each set of time and frequency resources may be configured with some transmission timing parameters, such that a TTI associated with the one or more first sets of resources and the normal mode may be different (e.g., shorter) than the TTI associated with the one or more second sets of resources and the high pathloss mode.

The communications manager 101 may be used for communications with a set of devices in the wireless communications system 100. For example, the communications manager 101 may be used for communications between a second wireless node using the one or more first sets of resources associated with the normal mode and a third wireless node using the one or more second sets of resources associated with the high pathloss mode.

In some cases, the communications manager 101 may be used to synchronize frame structures associated with the normal and high pathloss mode communications. To achieve system frame synchronization, the communications manager 101 may transmit an SFI in the frequency band associated with the high pathloss mode indicating the length and location of gaps between TTIs of the normal mode. The high pathloss mode may follow the gap structure of the normal mode to achieve slot format synchronization between the two communication modes. In cases where the slot or TTI structure changes for the normal mode, the high pathloss mode may adjust accordingly using information indicated in the SFI. Dynamic synchronization of the frame structure (e.g., where the structure of the high pathloss mode mirrors the structure of the normal mode) may allow for enhanced communication between nodes operating using both modes.

Figure 2:
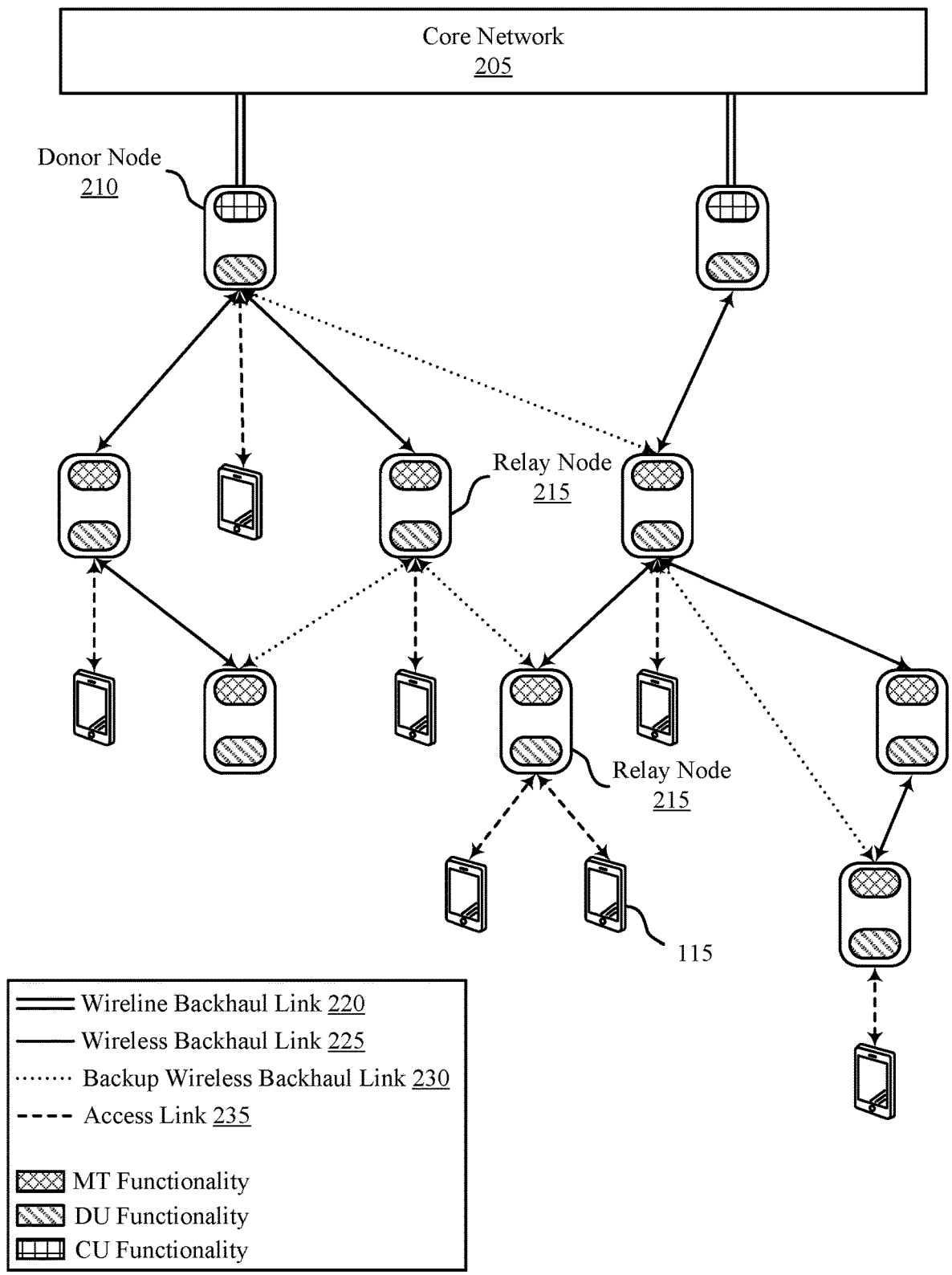

FIG. 2 illustrates an example of a wireless communications system 200 that supports high pathloss mode multiplexing in accordance with one or more aspects of the present disclosure. Wireless communications system 200 (e.g., an NR system, a mmW system) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and base stations 105 or supported devices split into one or more support entities (i.e., functionalities) for promoting wireless backhaul density in collaboration with communication access. Aspects of the supporting functionalities of the base stations 105 may be referred to as IAB nodes, such as IAB donor nodes 210 and IAB relay nodes 215. Wireless communications system 200 may additionally support a number of UEs 115, which may communicate on the uplink with one or more IAB donor nodes 210, IAB relay nodes 215, or a combination of these devices. In some examples, wireless communications system 200 may implement aspects of wireless communications system 100.

Wireless communications system 200 may include one or more IAB donor nodes 210, which may interface between a wireline network and a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (e.g., wireless backhaul links 225, backup wireless backhaul links 230, access links 235, etc.). An IAB donor node 210 may be split into associated base station centralized unit (CU) and distributed unit (DU) entities, where one or more DUs associated with an IAB donor node 210 may be partially controlled by an associated CU. CUs of IAB donor nodes 210 may host layer 3 (L3) (e.g., RRC, service data adaption protocol (SDAP), PDCP) functionality and signaling. Further, CUs of IAB donor nodes 210 may communicate with the core network 205 over a wireline backhaul link 220 (e.g., which may be referred to as an NG interface). DUs may host lower layer operations, such as layer 1 (L1) or layer 2 (L2) (RLC, MAC, physical layer, etc.) functionality and signaling. A DU entity of an IAB donor node 210 may support a serving cell within the network coverage area according to connections associated with wireless backhaul links 225 and access links 235 of the IAB network. DUs of the IAB donor nodes 210 may control both access and backhaul links within the corresponding network coverage and may provide controlling and scheduling for descendant (i.e., child) IAB relay nodes 215 and or UEs 115. For example, a DU may support an RLC channel connection with a UE 115 (e.g., via an access link 235) or with an IAB relay node 215 (e.g., via a backhaul link, such as a primary wireless backhaul link 225 or a backup wireless backhaul link 230).

IAB relay nodes 215 may be split into associated mobile terminal (MT) and base station DU entities, where MT functionality of the IAB relay nodes 215 may be controlled or scheduled by antecedent (i.e., parent) IAB nodes via wireless backhaul links. A parent node to an IAB relay node 215 may be another (antecedent) IAB relay node 215 or an IAB donor node 210. The MT functionality may be similar to functionality performed by UEs 115 in the system. An IAB relay node 215 may not be directly connected to a wireline backhaul 220. Instead, the IAB relay node 215 may connect to the core network 205 via other IAB nodes (e.g., any number of additional IAB relay nodes 215 and an IAB donor node 210) using wireless backhaul links. The IAB relay node 215 may transmit upstream (e.g., towards the core network 205) in the IAB system using MT functionality. In some cases, DUs of the IAB relay nodes 215 may be partially controlled by signaling messages from CU entities of an associated IAB donor node 210 (e.g., transmitted via an F1-application protocol (AP)). The DUs of the IAB relay nodes 215 may support serving cells of the network coverage area. For example, a DU of an IAB relay node 215 may perform the same or similar functions as a DU of an IAB donor node 210, supporting one or more access links 235 for UEs 115, one or more wireless backhaul links for downstream IAB relay nodes 215, or both.

Wireless communications system 200 may employ relay chains for communications within the IAB network architecture. For example, a UE 115 may communicate with an IAB node, and the IAB node may relay the data to a base station CU or the core network 205 either directly or via one or more IAB relay nodes 215. Each IAB relay node 215 may include a primary wireless backhaul link 225 for relaying data upstream or receiving information from a base station CU or the core network 205. In some cases, an IAB relay node 215 may additionally include one or more backup wireless backhaul links 230 (e.g., for redundant connectivity or improved robustness). If the primary wireless backhaul link 225 fails (e.g., due to interference, malfunction at a connected IAB node, movement of IAB nodes, maintenance at IAB nodes, etc.), an IAB relay node 215 may utilize a backup wireless backhaul link 230 for backhaul communication within the IAB network. The first (e.g., primary) wireless backhaul link 225 may be associated with a coverage area and MT functionality may be controlled or scheduled by a first parent node. The one or more secondary backhaul links (e.g., backup wireless backhaul links 230) may be associated with a non-collocated coverage area and controlled or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control or schedule descendant IAB relay nodes 215 and UEs 115 within the IAB network (e.g., downstream in the IAB network) via the configured backhaul and access links. That is, an IAB relay node 215 may act as a relay between an IAB donor node 210 and one or more descendant devices (e.g., other IAB relay nodes 215, UEs 115) in both communication directions based on established backhaul and access connections.

Wireless communications system 200 may support communications between wireless nodes operating according to both high pathloss and normal modes. Wireless transmissions may propagate over a number of paths or wireless links (e.g., wireless backhaul link 225 or access link 235) between nodes in the network. As the signal strength or power associated with the number of paths or wireless links may vary due to a number of factors including interference, diffraction, blockages, weather conditions, free space losses, and so on, a wireless node (e.g., IAB donor node 210) may configure one or more first sets of resources associated with the normal mode and configure a second set or resources associated with the high pathloss mode. Each set of resources may be time and frequency resources of the radio frequency spectrum band, and may be configured with some transmission timing parameters, such that a TTI associated with the one or more first sets of resources and the normal mode may be different (e.g., shorter) than the TTI associated with the one or more second sets of resources and the high-pathloss mode. The wireless node may then communicate with a second wireless node (e.g., a first IAB relay node 215) using the one or more first sets of resources associated with the normal mode, based on identifying that a wireless link between the wireless node and the second wireless node is below an identified pathloss threshold. In addition, the wireless node may communicate with a third wireless node (e.g., a second IAB relay node 215) using the one or more second sets of resources associated with the high-pathloss mode, based on identifying that a wireless link between the wireless node and the third wireless node satisfies or is above the identified pathloss threshold.

Facilitating communication between a wireless node and several other secondary nodes using both high pathloss and a normal mode operations may involve various multiplexing techniques (e.g., FDM, TDM, SDM). In normal (e.g., low pathloss) mode operation, a node may transmit or receive information according to a frame structure containing a number of slots. Each slot may be configured by an SFI, which may include a configuration of uplink and downlink transmission or reception opportunities within the slot. In cases where a half-duplex constraint applies, a node may not transmit and receive data from different modes during the same time period, and may therefore synchronize the frame structures of the both the high pathloss and normal modes.

Figure 3:
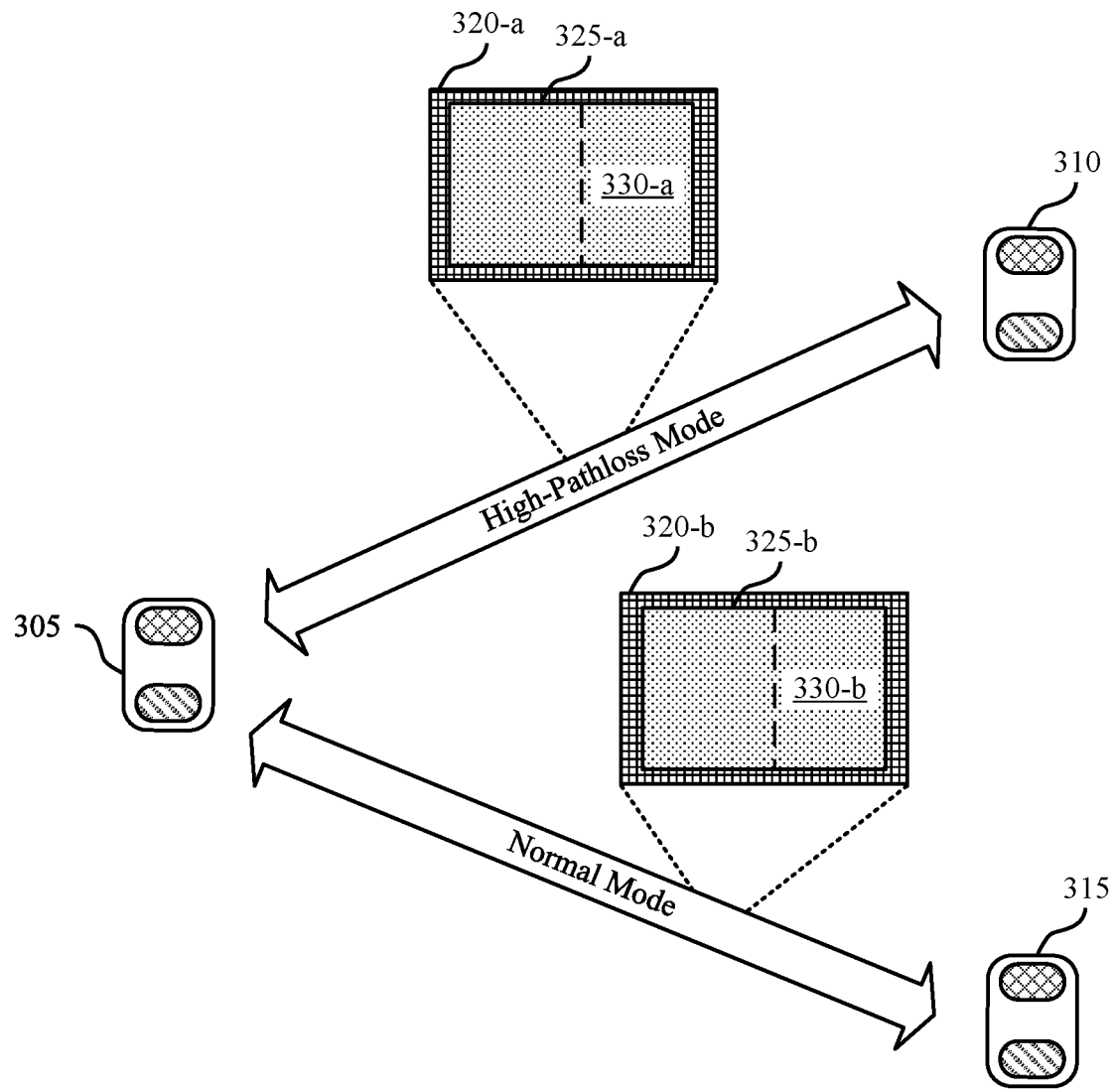

FIG. 3 illustrates an example of a wireless communications system 300 that supports high pathloss mode multiplexing in accordance with one or more aspects of the present disclosure. In some examples, wireless communications system 300 may implement aspects of wireless communications systems 100 or 200. In some aspects, wireless communications system 300 may operate within an IAB network. For example, IAB nodes 305, 310, and 315 may be nodes within a larger IAB network, and IAB node 305 may communicate with IAB node 310 or IAB node 315 over wireless or wired backhaul links. IAB nodes 305, 310, and 315 may be examples of wireless devices, relay nodes, donor nodes, or IAB nodes as described herein.

Aspects of the described techniques enable support for wireless communications over a radio frequency spectrum band in a high pathloss environment by utilizing a high pathloss mode. The high pathloss mode may utilize various parameters (e.g., modulation coding scheme (MCS), HARQ, aggregation level, reference signals) that may be configured or otherwise selected to support wireless communications over the radio frequency spectrum band experiencing a pathloss that satisfies (or exceeds) a threshold pathloss value.

In some cases, wireless devices (e.g., IAB nodes 305, 310, or 315) may operate in one of more pathloss modes such as a high pathloss mode when the pathloss value satisfies (or exceeds) a threshold pathloss value or a normal (e.g., low) pathloss mode when the pathloss value is below the threshold pathloss value. For instance, one or more wireless devices may perform wireless communications in the wireless communications system 300 over a radio frequency spectrum band. In some aspects, this may include the wireless device(s) operating in a first pathloss mode (e.g., a low pathloss mode or normal mode) in the wireless communications system 300. The wireless device(s) may receive a signal that indicates that the pathloss value may satisfy (or exceed) a threshold pathloss value. As one example, the wireless device(s) may monitor a channel of the radio frequency spectrum band (e.g., monitor signals being communicated over the channel) and determine the pathloss value satisfies (or exceeds) the threshold pathloss value. In another example, the wireless device(s) may receive a signal from another wireless device indicating that the pathloss value may satisfy (or exceed) the threshold pathloss value. Accordingly, the wireless device(s) may switch from the first pathloss mode (e.g., a low pathloss mode) to a second pathloss mode (e.g., high pathloss mode) and continue to perform wireless communications. The second pathloss mode (e.g., the high pathloss mode) may include one or more parameters to support continued wireless communications in the high pathloss environment. Examples of the parameters that may be adjusted may include, but are not limited to, the length of the synchronization signal block (SSB) in the high pathloss mode being longer, the length of a reference signal in the high pathloss mode being longer, an MCS in the high pathloss mode being lower, and the like. Accordingly, the wireless devices may continue to perform wireless communications in the wireless communications system 300 in the high pathloss environment according to the second pathloss mode (e.g., the high pathloss mode).

As shown, IAB node 305 may communicate with IAB node 310 in a high pathloss mode (e.g., if the high pathloss mode is activated at IAB node 305 for these communications) and may communicate with IAB node 315 in a normal mode (e.g., if the high pathloss mode is deactivated at IAB node 305 for these other communications). An indication of which mode to use for communication may be transmitted from IAB node 305 to one or both of IAB nodes 310 and 315. For example, IAB node 305 may transmit a communication configuration 320-*a* to IAB node 310 to communicate in high pathloss mode. The communication configuration 320-*a* may instruct IAB node 310 to operate in the high pathloss mode for communications with IAB node 305. The communication configuration 320-*a* may include a BWP information element (IE) 325-*a* that indicates BWP parameters for the BWP used for communication between IAB node 305 and IAB node 310. In some examples, the communication configuration 320-*a* may include one or more additional bits 330-*a*, which may indicate the BWP identified by BWP IE 325-*a* is configured for high pathloss communications. As shown, the one or more additional bits 330-*a* may be a part of the BWP IE 325-*a*.

For normal mode operations, IAB node 305 may transmit a communication configuration 320-*b* to IAB node 315. The communication configuration 320-*b* may include a BWP IE 325-*b*, and one or more additional bits 330-*b*, which may be a part of the BWP IE 330-*b*. The one or more additional bits 330-*b* may indicate that the BWP identified by BWP IE 325-*b* is configured for normal mode communications. Based on the communication configuration(s) 320, the DU or MT functionality of an IAB node 305, 310, or 315 may be configured with different downlink or uplink BWPs for high pathloss mode and normal mode that may be activated based on the communication configuration(s) 320 sent to the respective IAB node 310 or 315. For example, IAB node 310 may perform communications using the high pathloss BWP identified by BWP IE 325-*a* upon reception (or after a duration following reception) of communication configuration 320-*a*.

In some cases, IAB node 305 may enter a high pathloss mode and may communicate with IAB node 310 after a given time interval. For example, the communication configuration 320-*a* may include timing information (e.g., an indication of a time interval that IAB node 310 is to wait before operating in high pathloss mode), and IAB node 305 may instruct IAB node 310 to activate a high pathloss BWP based on this timing information. In some cases, the BWP IE 325-*a* may include additional information (e.g., via the one or more additional bits 330-*a*) which indicates the BWP may be configured for the high pathloss mode, which signals to the MT of IAB node 310 to fully enter the high pathloss mode after a specific time and reduced, or no, additional signaling may be used for entering or exiting high pathloss mode.

In some aspects, configuration parameters of the communication configuration 320 may be configured differently between pathloss modes (e.g., a first subset of configuration parameters may be variable between high pathloss mode and normal mode, while a second subset of configuration parameters may be configured to be the same between high pathloss mode and normal mode). For example, control resource set (CORESET) parameters, channel state information (CSI) resources, and sounding reference signal (SRS) resources may be different between high pathloss mode and normal mode. Further, if the one or more additional bits 330 correspond to a high pathloss mode (such as the one or more additional bits 330-*a*), a longer time duration for TTIs may be implemented for communications in the high pathloss mode as compared to the time duration associated with TTIs for normal mode. Additionally, or alternatively, rules specific to the high pathloss mode may be invoked (e.g., rules relating to procedures for interrupting data channels, such as a shared data channel, with a reference signal, such as a tracking reference signal (TRS)).

In some cases, other parameters (e.g., a second subset of configuration parameters) may be configured to be the same between high pathloss and normal mode operations. For example, processing time related control parameters (e.g., latency parameters related to scheduling, parameters related to control operations) may remain the same for normal and high pathloss modes.

Figure 4:
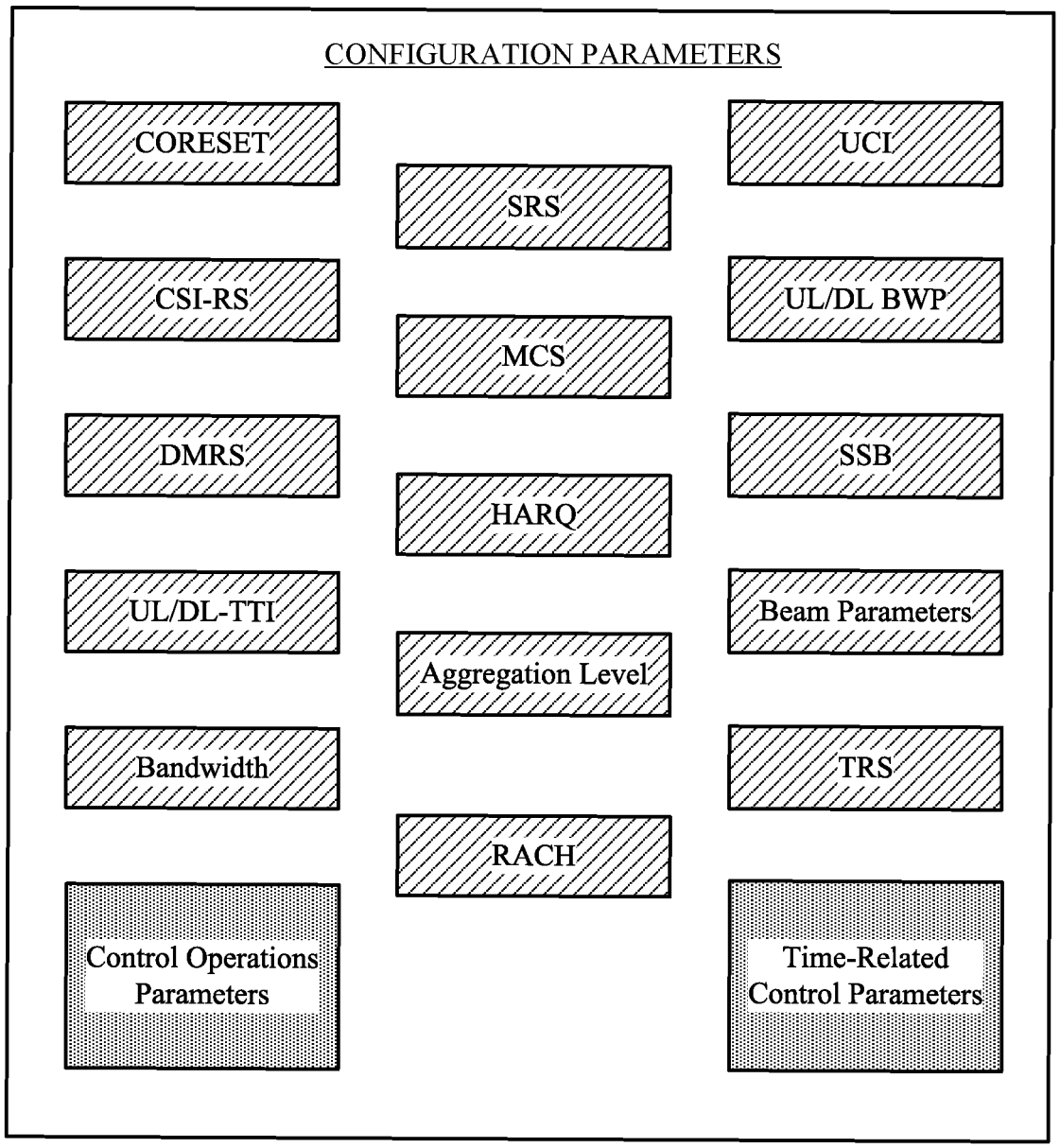
FIG. 4 illustrates example configuration parameters that support communication configuration for high pathloss operations in accordance with one or more aspects of the present disclosure.

FIG. 4 illustrates example configuration parameters 400 that supports communication configuration for high pathloss operations in accordance with one or more aspects of the present disclosure. In some examples, configuration parameters 400 may implement aspects of wireless communications systems 100, 200, or 300. Configuration parameters 400 may include a set of configuration parameters for configuring communications according to different pathloss modes.

In some examples, one or more configuration parameters 400 may be configured to support high pathloss mode communications (e.g., for devices operating in a high pathloss mode, such as a parent IAB node communicating with a child IAB node using a high pathloss communication link). Further, one or more configuration parameters 400 may be configured to support normal mode communications (e.g., for devices operating in a normal pathloss mode, such as a parent IAB node communicating with a child IAB node using a normal pathloss communication link).

In some cases, a subset of configuration parameters 400 may be configurable between pathloss modes. For example, one or more configuration parameters 400 may be variable or dynamic between pathloss modes, while other configuration parameters 400 may be static and remain the same between different pathloss modes. In one example, a subset of the configuration parameters 400 that may be different for high pathloss mode operation compared to normal mode operation. Such parameters may include CORESET parameters (e.g., CORESET #0 information or common CORESET information), CSI-RS parameters (e.g., CSI-RS resource configuration, periodicity, measurement information), and SRS parameters (e.g., SRS configuration, SRS resources). Other configurable parameters may include uplink control information (UCI) parameters (e.g., UCI resources), MCS parameters (e.g., modulation order, coding scheme), and uplink or downlink BWP parameters (e.g., control or data channel configuration parameters, frequency location, numerology, timing information, etc.). Demodulation reference signal (DMRS) parameters (e.g., DMRS resources or mapping type), HARQ parameters (e.g., HARQ feedback information such as #HARQ N1, MCS, etc.), SSB parameters (SSB position, periodicity, or power), uplink or downlink TTI information (e.g., uplink TTI duration and location, downlink TTI duration and location), aggregation level parameters, beam parameters (e.g., beam width or index), bandwidth parameters (e.g., cell reference signal ports, frequency information), TRS parameters (e.g., rules for interrupting PUSCH), and random access channel (RACH) parameters (e.g., RACH timing and resources), among others may also be configurable between different pathloss modes.

For example, one or more MCS parameters of the configuration parameters 400 may be configurable between pathloss modes. An MCS parameter may be associated with or include an MCS table with a number of entries (e.g., 16 entries). An entry may correspond to a coding rate or modulation order (e.g., quadrature phase shift keying (QPSK), quadrature amplitude modulation (QAM) formats such as QAM 16, QAM 64, and the like). In some examples, the MCS table may be configurable based on a pathloss mode. For example, the MCS table used for a normal pathloss operation mode may be different from the MCS table used for a high pathloss operation mode. In some examples, the MCS tables may be different (e.g., each MCS table may include different entries) based on channel conditions. For example, an MCS table may include different entries based on a pathloss dynamic range (e.g., whether the pathloss dynamic range is associated with a normal pathloss operation mode or a high pathloss operation mode), a signal-to-interference-plus-noise ratio (SINR), or any other channel condition metrics.

In some examples, a wireless device (e.g., a base station 105 or a parent IAB node) may send a control transmission (e.g., a physical downlink control channel (PDCCH) transmission) to a receiving wireless device (e.g., a UE 115 or a child IAB node). The control transmission may schedule a shared channel transmission (e.g., a physical downlink shared channel (PDSCH) transmission or a physical uplink shared channel (PUSCH) transmission). The control transmission may also include downlink control information (DCI), which may indicate, to the receiving wireless device, one or more configuration parameters 400. For instance, the DCI may indicate the MCS parameter (e.g., an entry of the MCS table) to the receiving wireless device. The receiving wireless device may determine a coding rate and modulation order based on the indication in the DCI (e.g., the coding rate and modulation order associated with the indicated entry of the MCS table). The receiving wireless device may use the determined coding and modulation order to transmit or receive a scheduled shared channel transmission.

Other configuration parameters 400 may be configured similarly between high pathloss and normal modes. For example, configuration parameters 400 such as time-related control parameters (e.g., processing time related parameters, latency parameters, switching time parameters, scheduling parameters, or any combination of these or similar control parameters) may be similarly configured for both high pathloss and normal modes. Further, other control operation parameters, such as timing for beam change (e.g., timing between beam change command and the change of the beam), may be similarly configured for both high pathloss and normal modes.

Figure 5:
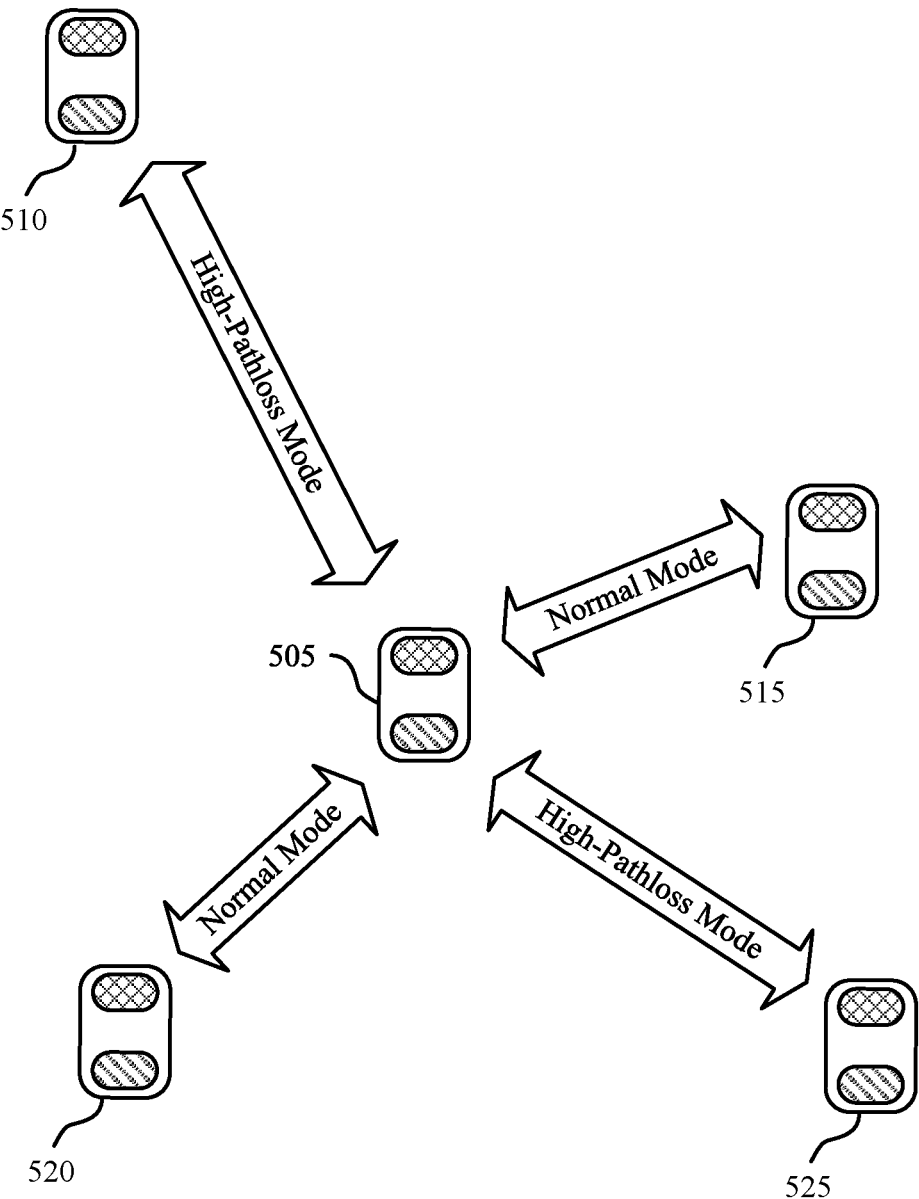
FIG. 5 illustrates an example of a wireless communications system that supports high pathloss mode multiplexing in accordance with one or more aspects of the present disclosure.

FIG. 5 illustrates an example of a wireless communications system 500 that supports high pathloss mode multiplexing in accordance with one or more aspects of the present disclosure. Wireless communications system 500 (e.g., an NR system, a mmW system) may supplement wireline backhaul by sharing infrastructure and spectral resources for network access with wireless backhaul link capabilities. Wireless communications system 500 may include supported devices split into one or more support entities (i.e., functionalities) for promoting wireless backhaul density in collaboration with communication access. Wireless communications system 500 may contain donor node 505 and a number of relay nodes 510, 515, 520, and 525. Donor node 505 may be another relay node and any of the relay nodes 510, 515, 520, and 525 may be access nodes (e.g., a UE).

In some examples, wireless communications system 500 may support a different number of donor nodes and relay nodes and may similarly support a different combination of nodes or other devices. In such examples, donor node 505 may employ a high pathloss mode of communication for links experiencing pathloss above or meeting a threshold pathloss, and may employ a normal (e.g., low pathloss) mode of communication for links experiencing pathloss below the threshold pathloss. In the example of wireless communications system 500, donor node 505 may configure resources using a high pathloss mode for communication with relay nodes 510 and 525. Similarly, donor node 505 may configure resources using a normal mode for communication with relay nodes 520 and 515. Wireless communications system 500 may implement aspects of wireless communications systems described with reference to FIGS. 1-4 described herein.

Wireless communications system 500 may contain a number of communication links or transmission propagation paths between the nodes or other wireless communication devices in the network. Wireless communications system 500 may operate in frequency ranges (e.g., mmW frequency ranges) associated with increased signal attenuation (e.g., pathloss) based on various factors such as temperature, blockage or interference, weather conditions, diffraction, and so on. A number of signal processing and beamforming techniques may be used to coherently combine energy and overcome pathloss in such frequency ranges. For example, one or more wireless nodes or devices (e.g., donor node 505, relay node 510, relay node 525) may operate in a high pathloss mode in cases where a pathloss value for the system or for a wireless link satisfies or exceeds a threshold pathloss value (e.g., 20-30 dB higher than the pathloss in normal operation). Operating in a high pathloss mode may allow the wireless nodes or devices to satisfy reliability targets and maintain a link budget in challenging pathloss environments. High pathloss mode operations, however, may also increase the transmission duration of signals along with the transmission timing of some control and data channels, and may restrict operation on narrow communication bandwidths such that it may be inefficient for nodes to operate according to a high pathloss mode for all communications. Alternatively, the wireless devices or wireless nodes may operate in a low pathloss mode (e.g., a normal mode) in cases where the pathloss value is below the threshold pathloss value.

In the example of wireless communications system 500, a number of nodes may communicate using a number of wireless links. Each node pair may include a donor node 505 and a relay node (e.g., relay node 510, 515, 520, or 525), both of which may communicate using a mode of operation (e.g., a high pathloss mode or a normal mode) depending on, for example, whether the pathloss between the nodes exceeds a pathloss threshold, or other network conditions. In some examples, the node pair may switch between operations in a high pathloss mode and operations in a normal mode depending on various factors such as changing pathloss conditions. In some aspects, the node pair may determine to switch between a high pathloss mode and a normal mode autonomously. For example, donor node 505 may operate in a normal mode over various wireless links and may receive a signal that indicates that the pathloss value of the radio frequency spectrum band satisfies or exceeds the threshold pathloss value. Donor node 505 may then switch to operating in a high pathloss mode for the links experiencing the high pathloss value.

In some cases, donor node 505 may communicate with a number of relay nodes (e.g., relay nodes 510, 515, 520, and 525) over a set of wireless links. For example, a first subset of the wireless links (e.g., high pathloss mode links) may experience pathloss while the remaining subset of wireless links (e.g., normal mode links) may not experience pathloss, or may experience minimal pathloss compared to the first subset of wireless links. Donor node 505 may therefore employ a high pathloss mode for communications using the first subset of links between relay nodes 510 and 525, and may maintain normal mode operations for the rest of the set of links between relay nodes 515 and 520. In some examples, donor node 505 may communicate with relay node 510 using a first mode of operation (e.g., a high pathloss mode), and may communicate with relay node 515 using a second mode of operation (e.g., a normal mode). In other examples, donor node 505 may communicate with a number of other wireless nodes over a number of wireless links and modes of operation. The donor node 505 may employ techniques to maintain communication over the links using both high pathloss mode and normal modes. Such techniques may allow a portion of wireless communications system resources (e.g., a subset of communication links in the network) to operate in a high pathloss mode while the remaining subset of communication links in the network resumes normal mode operation.

In some cases, operations using both modes may help the network maintain high reliability. For example, some of the links in wireless communications system 500 may have a high reliability standard (e.g., a reliability goal of 0.99999), such that the reliability of wireless communications be maintained during all weather conditions, propagation path variations, interference events, and so on. However, propagation pathloss may increase on a subset of communication links served by a given donor node. In some examples of a challenging pathloss environment, a subset of communication links may experience pathloss in conditions such as heavy rain (which may add an additional 30-45 dB of loss) while a different subset of links outside of the effects of the heavy rain experience relatively little or no pathloss. The donor node 505 may apply a high pathloss mode to links associated with relay nodes 510 and 525, or the subset of links experiencing high pathloss conditions (e.g., the links experiencing interference from heavy rain). Donor node 505 may maintain a normal pathloss mode for the links associated with relay nodes 515 and 520, or the subset of links experiencing normal pathloss conditions. In this way, donor node 505 may continue to communicate across most, or all, links without the majority, or all, links using a high pathloss mode.

Figure 6:
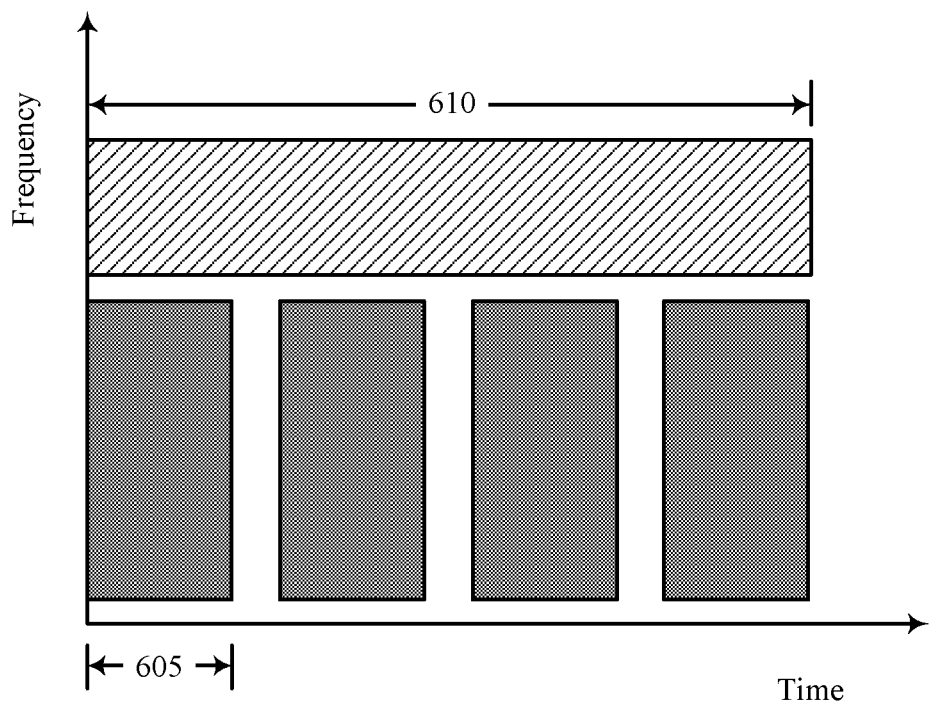
FIG. 6 illustrates an example of a radio frequency spectrum band that supports high pathloss mode multiplexing in accordance with one or more aspects of the present disclosure.

FIG. 6 illustrates an example of a radio frequency spectrum band 600 with frame structure that supports high pathloss mode multiplexing in accordance with one or more aspects of the present disclosure. In some examples, radio frequency spectrum band 600 may be a part of or may implement aspects of wireless communications systems described with reference to FIGS. 1-5, and may be an example of a shared or unlicensed radio frequency spectrum band. Radio frequency spectrum band 600 may be configured to support communication using a number of communication modes depending on various system parameters or standards. For example, radio frequency spectrum band 600 may include time and frequency resources allocated to transmissions using both a normal mode and a high pathloss mode. Wireless devices or nodes in the network may utilize the resources in radio frequency spectrum band 600 for various communications, which may in some examples include simultaneous or concurrent communications across the various communication modes.

A network may use FDM or TDM, where frequency or time partitioning may be performed deterministically. Other possible multiplexing schemes include SDM and the like. In cases where a network uses FDM techniques for multiplexing high pathloss and normal communication modes, the network may partition a number of frequency components of radio frequency spectrum band 600 into different frequency sub-components that may be allocated for different modes of communication (e.g., a high pathloss mode or a normal mode). For example, operations utilizing a high pathloss mode may be allocated to one CC or TTI (e.g., TTI 610), while operations utilizing a normal mode may be allocated to a separate CC or TTI (e.g., TTI 605). In some examples, operations may be allocated to only a portion of the CC (which may account for some mode limitations such as those associated with transmission power over the entire CC).

In some cases, the length of TTI 605 allocated for normal mode communication (e.g., the amount of time-frequency resources allocated to transmission in TTI 605) may be shorter than the length of TTI 610 allocated for high pathloss mode communication. Similarly, in some examples, the length of various reference signals (CSI-RS, DRMS, etc.) may be shorter in the normal mode than in the high pathloss mode.

In some cases, other system parameters may differ for communications over the high pathloss and normal modes. For example, the bandwidth utilized in the high pathloss mode may be narrower than the bandwidth utilized in the normal mode, which may improve overall communication over the radio frequency spectrum band 600.

Figure 7:
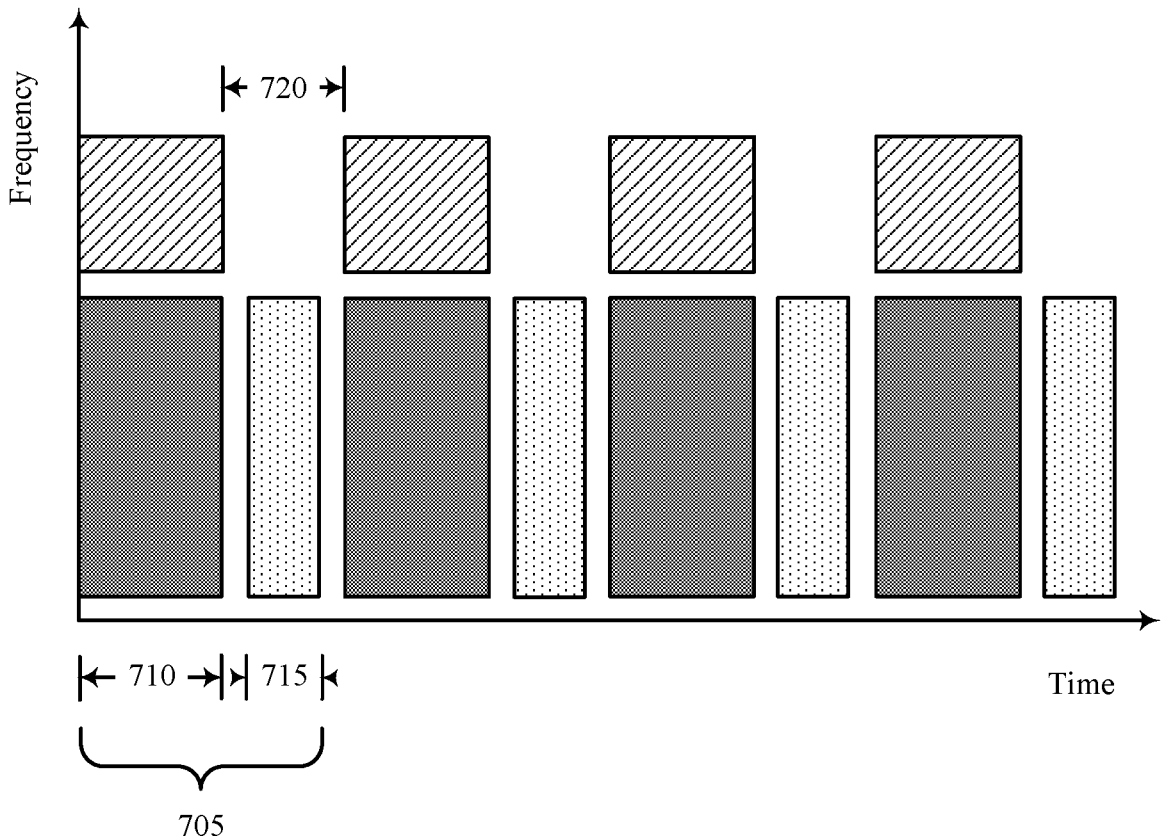
FIG. 7 illustrates an example of a radio frequency spectrum band that supports high pathloss mode multiplexing in accordance with one or more aspects of the present disclosure.

FIG. 7 illustrates an example of a radio frequency spectrum band 700 with frame structure that supports high pathloss mode multiplexing in accordance with one or more aspects of the present disclosure. In some examples, radio frequency spectrum band 700 may be a part of or may implement aspects of wireless communications systems described with reference to FIGS. 1-6, and may be an example of a shared or unlicensed radio frequency spectrum band. Radio frequency spectrum band 700 may be configured to support communication using a number of communication modes depending on various system parameters or standards.

In some system deployments, a first wireless node (e.g., a donor node) may communicate with a second wireless node (e.g., a first relay node) while also communicating with a third wireless node (e.g., a second relay node). In one example, the wireless nodes may be spatially separated such that the angle of arrival (AOA) and angle of departure (AOD) of signaling communications between nodes exceeds a threshold angle. In such cases, the nodes may utilize full duplex communications, and the donor node may transmit or receive from the first and second relay nodes independently. The communication mode used for transmission or reception (e.g., the high pathloss mode or normal mode) may be selected independently per node pair, and communications between the donor node and the first relay node may occur on a different frequency band than communications between the donor node and the second relay node. Additionally, communication between two or more nodes may occur (e.g., using FDD, with separate frequencies allocated for transmission and reception between the nodes). In an example, the donor node may communicate during a period of time with the first relay node using a high pathloss mode and may communicate during the same period of time with the second relay node using a normal mode such that both transmissions and receptions may occur at the same time at a node. In such examples, the wireless network may employ full-duplex methods for communication.

In other system deployments, the donor node may communicate with the first relay node while also communicating with the second relay node. In one example, the nodes may be separated such that the AOA and AOD of signals between nodes satisfies or is below a threshold angle. In such cases, the nodes may utilize half-duplex communication, and communications between nodes may not be independent of one another. As such, a node may transmit or receive signals from other nodes using both high pathloss and normal modes during separate time periods, but may not transmit or receive signals using the high pathloss and normal modes simultaneously. Further, communications between the node pairs may occur on the same frequency band such that, for example, communications between the donor node and the first relay node may occur on the same frequency band as communications between the donor node and the second relay node. In such examples, the transmission and reception modes may be synchronized between the high pathloss mode and the normal mode.

In some other cases (e.g., when communication is constrained to half-duplex), communications using both high pathloss and normal modes may be synchronized according to a system frame structure, each frame containing a number of TTIs 705 which may include allocated time and frequency resources for communications. For a normal mode, a TTI may contain both a transmission period 710 and a reception period 715, where a node may transmit or receive data using the normal mode during the allocated transmission period 710 or reception period 715, respectively. To accommodate communications using the normal mode, and to further accommodate the conditions of half-duplex, a node may transmit using a high pathloss mode during normal mode transmission periods 710, but may not transmit using a high pathloss mode during normal mode reception periods 715. As such, the system frame structure may contain a number of gaps 720 in the high pathloss mode band to synchronize high pathloss mode transmission periods with normal mode transmission periods.

Figure 8:
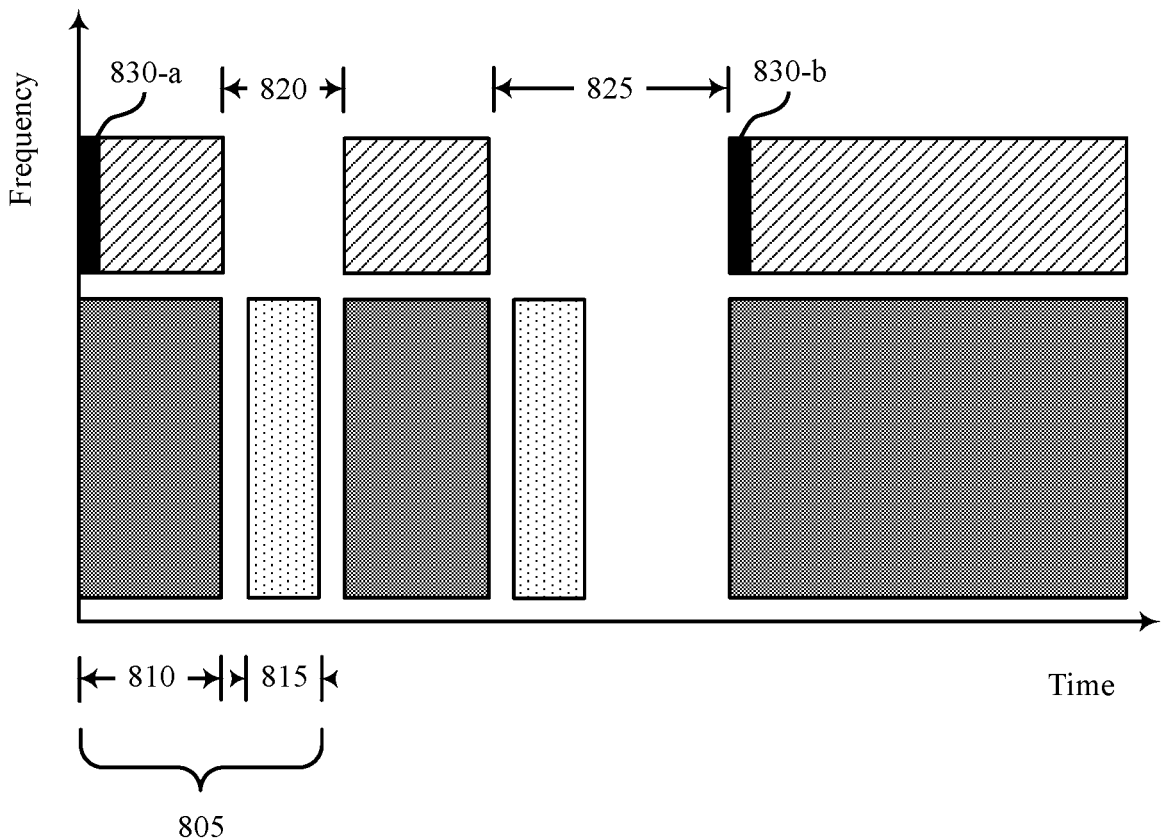
FIG. 8 illustrates an example of a radio frequency spectrum band that supports high pathloss mode multiplexing in accordance with one or more aspects of the present disclosure.
Figure 8:
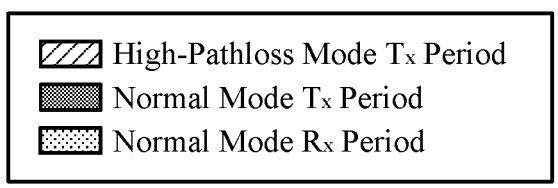

FIG. 8 illustrates an example of a radio frequency spectrum band 800 with frame structure that supports high pathloss mode multiplexing in accordance with one or more aspects of the present disclosure. In some examples, radio frequency spectrum band 800 may be a part of or may implement aspects of wireless communications systems described with reference to FIGS. 1-7, and may be an example of a shared or unlicensed radio frequency spectrum band. Radio frequency spectrum band 800 may be configured to support communication using a number of communication modes depending on various system parameters or standards.

Radio frequency spectrum band 800 may in some cases be constrained to half-duplex communication. In such cases, communications using communication modes, (e.g., using high pathloss and normal modes) may be synchronized according to a system frame structure. Each frame may contain a number of TTIs 805 which may include allocated time and frequency resources for communications. For a normal mode, a TTI 805 may contain both a transmission period 810 and a reception period 815, where a node may transmit or receive data using the normal mode during the allocated transmission period 810 or reception period 815, respectively. To accommodate communications using the normal mode, and to further accommodate the conditions of half-duplex, a node may transmit using a high pathloss mode during normal mode transmission periods 810, but may not transmit using a high pathloss mode during normal mode reception periods 815. As such, the system frame structure may contain a number of gaps (e.g., gaps 820, 825, and so on) in the high pathloss mode band to synchronize high pathloss mode transmission periods with normal mode transmission periods. In some cases, the gap structure may vary over radio frequency spectrum band 800, as shown.

To achieve slot format synchronization in a system with variable transmission gap structure, a first node may, in some cases, transmit an SFI 830 or other control information in a BWP associated with the high pathloss mode. The SFI may contain some frame structure information, such as the location and duration of gaps 820 and 825 between transmission periods for operations in a normal mode during a given TTI 805. The gap structure indicated in the SFIs 830 of the high pathloss mode may depend on the slot format of the multiplexed normal mode, and the SFI of the normal mode may be included in first SFI 830-a and second SFI 830-b in the high pathloss mode. In some cases, a number of SFIs 830 may be used to indicate changes in network frame structure or gap structure between transmissions, which may resynchronize the slot format. For example, the first node may transmit first SFI 830-a to indicate a first transmission gap structure for a high pathloss mode. The first node may transmit a second SFI 830-b to indicate a second transmission gap structure or a change in transmission gap structure of the high pathloss mode. In some cases, such SFI signaling may re-synchronize the frame structure and associated communications for the wireless nodes.

Figure 9:
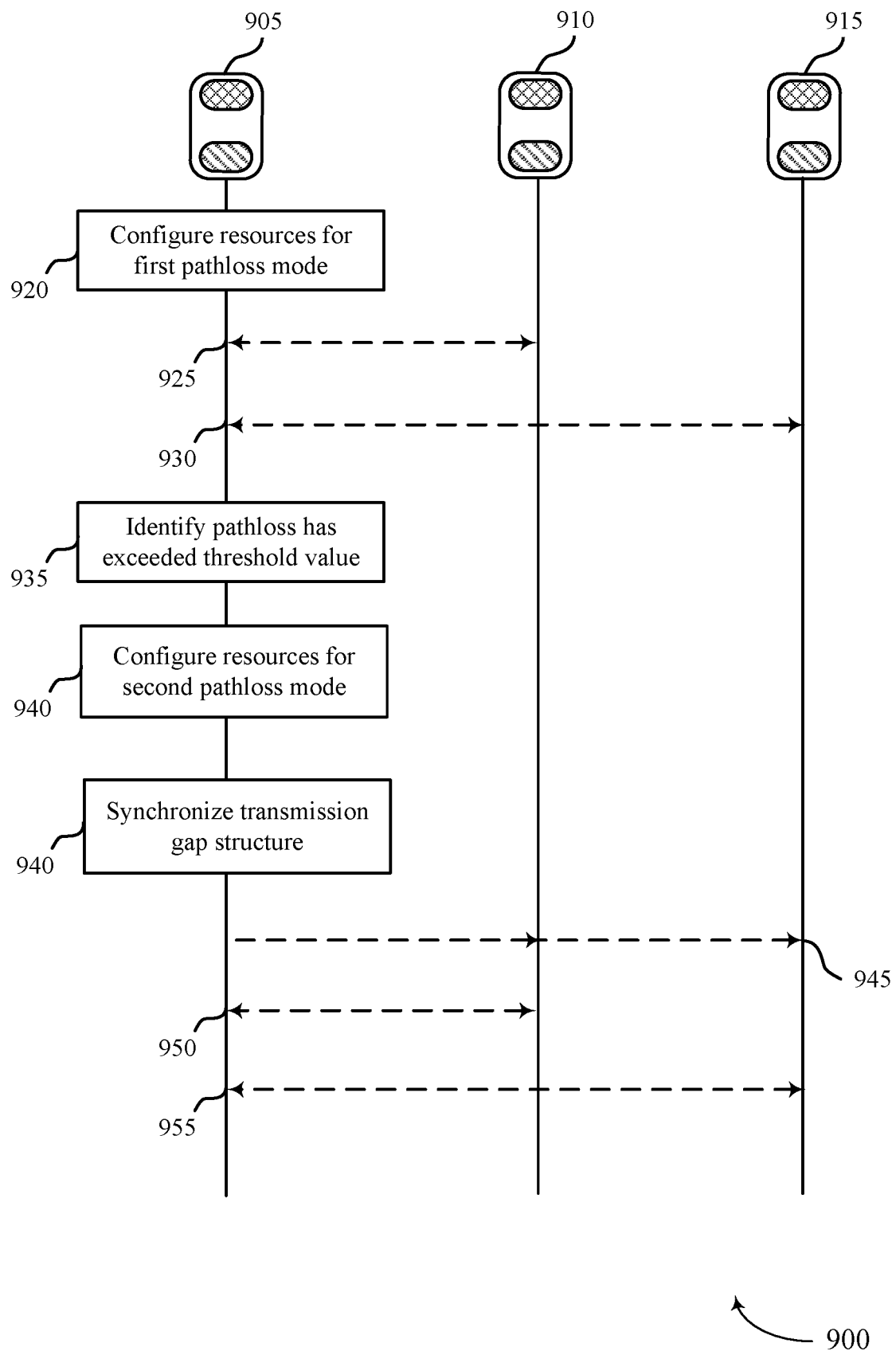
FIG. 9 illustrates an example of a process flow that supports high pathloss mode multiplexing in accordance with one or more aspects of the present disclosure.

FIG. 9 illustrates an example of a process flow 900 that supports high pathloss mode multiplexing in accordance with one or more aspects of the present disclosure. In some examples, process flow 900 may implement aspects of wireless communications system 100. The process flow 900 may include IAB donor node 905, along with IAB relay nodes 910 and 915, each of which may be examples of IAB donor and relay nodes as described with reference to FIGS. 2-5, and may operate according to a frame structure of a radio frequency spectrum band as described with reference to FIGS. 6-8.

At 920, IAB donor node 905 may configure one or more first sets of time or frequency resources of a radio frequency spectrum band for communications with a first pathloss mode. The one or more first sets of resources configured may have an associated first TTI length (in time or frequency resources), an associated first reference signal (e.g., RRC, SFI, etc.), an associated first MCS, an associated first bandwidth, an associated first beam width, and so on. In some cases, the first pathloss mode may be configured for communications using wireless communication links that are associated with a pathloss value below a threshold pathloss value. In some cases, the IAB donor node 905 may configure the one or more first sets of resources for a single IAB relay node. In other cases, the IAB donor node 905 may configure the one or more first sets of resources for a number of IAB relay nodes (e.g., IAB relay nodes 910, 915, and so on).

At 925, IAB donor node 905 may identify a pathloss value of a communication link in the radio frequency spectrum band associated with IAB relay node 910 may be below a threshold pathloss value, and may communicate with IAB relay node 910 using the first pathloss mode. Similarly, IAB donor node 905 may communicate with IAB relay node 915 using the first pathloss mode upon identifying that a pathloss value of a communication link the radio frequency spectrum band associated with IAB relay node 915 may be below the threshold pathloss value. IAB donor node 905 may communicate over a communication link or a subset of communication links, which may be further configured from a set of communication links.

At 935, IAB donor node 905 may receive an indication that a pathloss value of one of the communication links in the radio frequency spectrum band may satisfy or exceed a threshold pathloss value. The indication may be received during ongoing communication with IAB relay nodes 910 and 915. For example, IAB donor node 905 may receive an indication that the pathloss value of the communication link associated with IAB relay node 915 exceeds a threshold pathloss value.

In some aspects, the indication may be a signal exchanged during ongoing communication between the IAB donor node 905 and IAB relay nodes 910 and 915 (e.g., in uplink, downlink, backhaul, and access signals, etc.). Accordingly, the IAB donor node may measure the received power level of the indication or signal and determine that the receive power level is at or below a threshold level. The receive power level being at or below the threshold level may provide an indication that the pathloss value satisfies or exceeds the threshold pathloss value.

In some aspects, the indication may explicitly or implicitly convey information that the pathloss value satisfies or exceeds the threshold pathloss value. For example, the indication may explicitly indicate the pathloss value, or may indicate that an associated IAB node may be switching to operating according to a high pathloss mode. In some examples, the indication may be of a channel performance feedback (e.g., a channel quality indicator (CQI)) which may indicate the pathloss value of a communication link satisfies or exceeds a threshold pathloss value.

In some aspects, the indication may be transmitted using out-of-band signaling (e.g., using a different radio frequency spectrum band than is being used for ongoing wireless communications between IAB nodes). In some aspects, the signal may be a unicast signal (e.g., a signal transmitted in a unicast transmission from one IAB node to another, or from any other wireless device communicating over the radio frequency spectrum band).

At 940, IAB donor node 905 may configure a second set of time or frequency resources of a radio frequency spectrum band for communications using a second pathloss mode. The second set of configured resources may have an associated second TTI length (in time or frequency resources), an associated second reference signal (e.g., RRC, SFI, etc.), an associated second MCS, an associated second bandwidth, an associated second beam width, and so on. In some cases, the second pathloss mode may be configured for communications using wireless communication links that are associated with a pathloss value that satisfies or may be above the threshold pathloss value. In some cases, the IAB donor node 905 may configure the one or more second sets of resources for a single IAB relay node. In other cases, the IAB donor node 905 may configure the one or more second sets of resources for a number of IAB relay nodes (e.g., IAB relay nodes 910, 915, and so on).

In some cases, configuring the one or more second sets of time or frequency resources associated with the second pathloss mode may include synchronizing communications with the one or more first sets of time or frequency resources associated with the first pathloss mode. In some cases, the IAB donor node 905 may configure a set of gaps for communications of the first pathloss mode via the one or more first sets of resources, and may configure a set of TTIs for communication of the second pathloss mode via the one or more second sets of resources.

At 940, IAB donor node 905 may synchronize the set of gaps corresponding to the first pathloss mode with the set of TTIs corresponding to the second pathloss mode. In some cases, IAB donor node 905 may transmit an SFI which may include some frame structure information, including gap structure information that may be used to synchronize gaps transmission periods between nodes. Gap structure information may include information such as the location and duration of gaps between transmission periods for operations in a first pathloss mode during a given TTI. In some cases, changes in network frame structure or gap structure between transmissions may be synchronized using other methods or signaling. For example, IAB donor node 905 may transmit an indication of a first transmission gap structure for the first pathloss mode, and may transmit a second indication for a second transmission gap structure or a change in transmission gap structure for the second pathloss mode. In some cases, such signaling may synchronize the frame structure and associated transmission gap structure for the IAB nodes.

At 945, IAB donor node 905 may transmit a gap structure associated with the set of gaps in transmission, where the gap structure indicates respective locations and lengths corresponding to the set of gaps in transmission. In some cases, the gap structure may further indicate the system frame structure for transmissions between IAB nodes, as described herein.

At 950, IAB donor node 905 may communicate with IAB relay node 910 using a first pathloss mode and associated first set of time or frequency resources of a radio frequency spectrum band. The first pathloss mode may have an associated first TTI length (in time or frequency resources), an associated first reference signal (e.g., RRC, SFI, etc.), an associated first MCS, an associated first bandwidth, an associated first beam width, and so on.

At 955, IAB donor node 905 may communicate with IAB relay node 915 using a second pathloss mode associated second set of time or frequency resources of a radio frequency spectrum band. The second pathloss mode may have an associated second TTI length (in time or frequency resources), an associated second reference signal (e.g., RRC, SFI, etc.), an associated second MCS, an associated second bandwidth, an associated second beam width, and so on.

Figure 10:
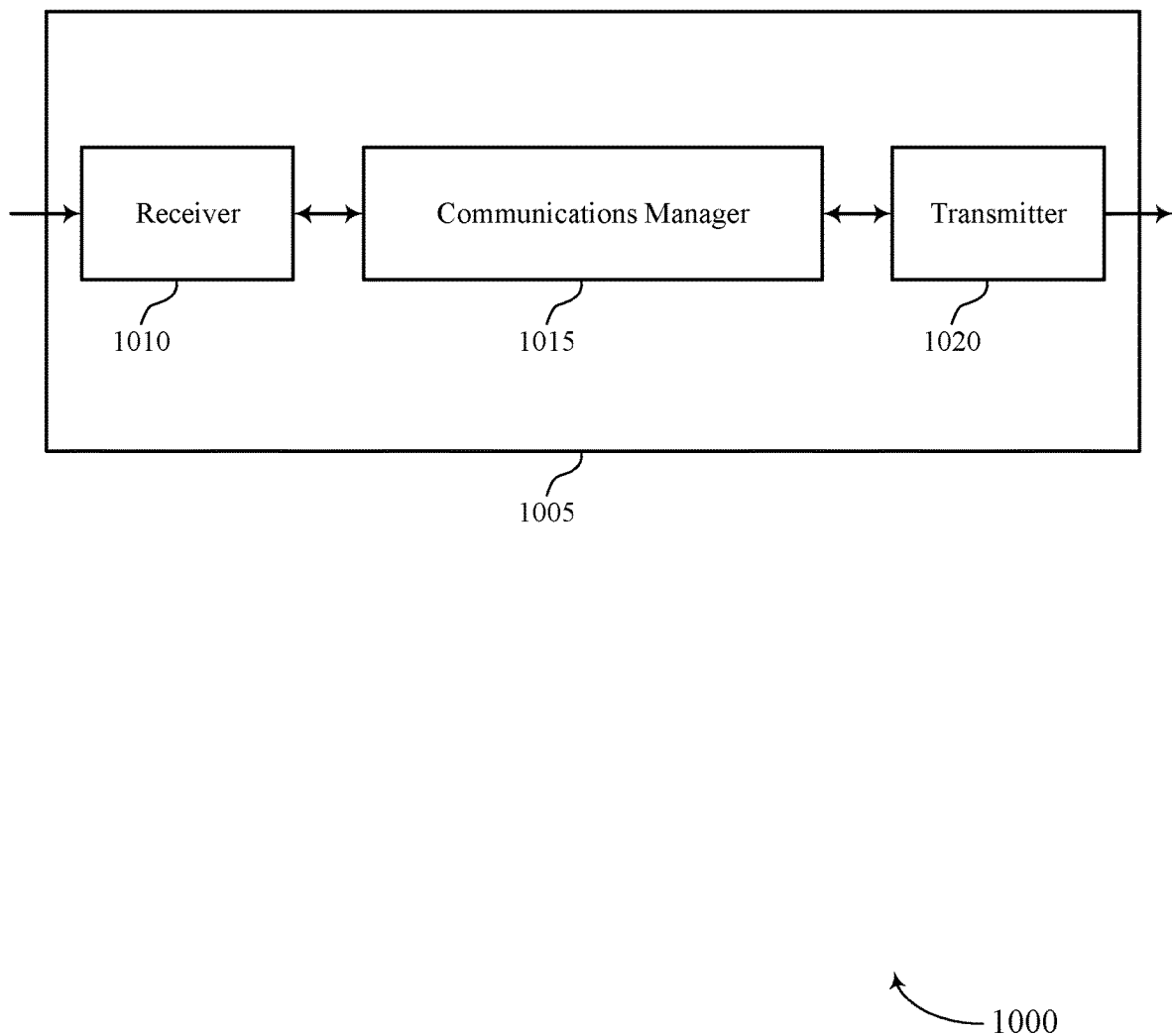
FIGS. 10 and 11 show block diagrams of devices that support high pathloss mode multiplexing in accordance with one or more aspects of the present disclosure.

FIG. 10 shows a block diagram 1000 of a device 1005 that supports high pathloss mode multiplexing in accordance with one or more aspects of the present disclosure. The device 1005 may be an example of aspects of a UE 115 or base station 105 as described herein. The device 1005 may include a receiver 1010, a communications manager 1015, and a transmitter 1020. The device 1005 may also include a processor. Each of these components may be in communication with one another (e.g., via one or more buses).

Receiver 1010 may receive information such as packets, user data, or control information associated with various information channels (e.g., control channels, data channels, and information related to high pathloss mode multiplexing, etc.). Information may be passed on to other components of the device 1005. The receiver 1010 may be an example of aspects of the transceiver 1320 or 1420 as described with reference to FIGS. 13 and 14. The receiver 1010 may utilize a single antenna or a set of antennas.

The communications manager 1015 may configure one or more first sets of resources of a radio frequency spectrum band for communications associated with a first pathloss mode, configure one or more second sets of resources of the radio frequency spectrum band for communications associated with a second pathloss mode, where a first length of a first TTI associated with the first pathloss mode is different from a second length of a second TTI associated with the second pathloss mode, communicate with a second wireless device operating in the first pathloss mode via the one or more first sets of resources, and communicate with a third wireless device operating in the second pathloss mode via the one or more second sets of resources.

Additionally, or alternatively, the communications manager 1015 may also configure one or more sets of resources of a radio frequency spectrum band for communications associated with a first pathloss mode, where a first length of a first TTI associated with the first pathloss mode is different from a second length of a second TTI associated with a second pathloss mode and communicate with a second wireless device in the first pathloss mode using a communication link via the one or more sets of resources. The communications manager 1015 may be an example of aspects of the communications manager 1310 or 1410 as described herein.

The actions performed by the communications manager 1015 as described herein may support improvements in signaling overhead related to operation in a high pathloss mode. In one or more aspects, a wireless node that may allow a portion of a connected network (e.g., IAB network) to operate in a high pathloss mode. A portion of the network operating in a high pathloss mode may allow the rest of the network to resume a normal mode of operation, which may result in more efficient communications (e.g., decreased latency in the system), among other improvements.

Based on a portion of a network operating in a high pathloss mode as described herein, a processor of a wireless node (e.g., a processor controlling the receiver 1010, the communications manager 1015, the transmitter 1020, or a combination thereof) may reduce complexity while providing efficient communications. For example, communicating over links using both high pathloss modes and normal modes may realize reduced signaling overhead and power savings, among other benefits.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 or 1420 as described with reference to FIGS. 13 and 14. The transmitter 1020 may utilize a single antenna or a set of antennas.

Figure 11:
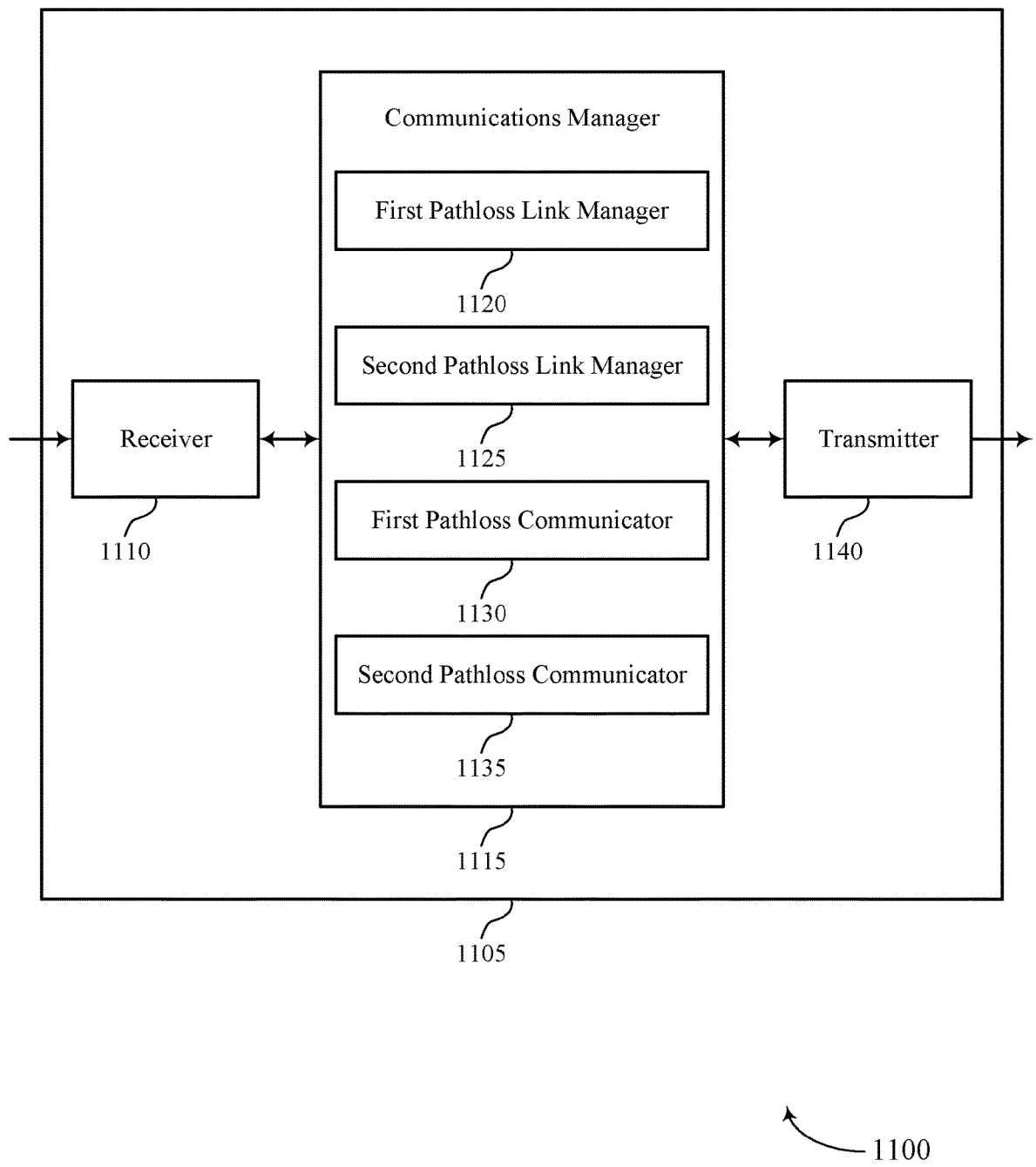

FIG. 11 shows a block diagram 1100 of a device 1105 that supports high pathloss mode multiplexing in accordance with one or more aspects of the present disclosure. The device 1105 may be an example of aspects of a device 1005, a UE 115, or a base station 105 as described herein. The device 1105 may include a receiver 1110, a communications manager 1115, and a transmitter 1140. The device 1105 may also include a processor. Each of these components may be in communication with one another (e.g., via one or more buses).

Receiver 1110 may receive information such as packets, user data, or control information associated with various information channels (e.g., control channels, data channels, and information related to high pathloss mode multiplexing, etc.). Information may be passed on to other components of the device 1105. The receiver 1110 may be an example of aspects of the transceiver 1320 or 1420 as described with reference to FIGS. 13 and 14. The receiver 1110 may utilize a single antenna or a set of antennas.

The communications manager 1115 may be an example of aspects of the communications manager 1015 as described herein. The communications manager 1115 may include a first pathloss link manager 1120, a second pathloss link manager 1125, a first pathloss communicator 1130, and a second pathloss communicator 1135. The communications manager 1115 may be an example of aspects of the communications manager 1310 or 1410 as described herein.

The first pathloss link manager 1120 may configure one or more first sets of resources of a radio frequency spectrum band for communications associated with a first pathloss mode.

The second pathloss link manager 1125 may configure one or more second sets of resources of the radio frequency spectrum band for communications associated with a second pathloss mode, where a first length of a first TTI associated with the first pathloss mode is different from a second length of a second TTI associated with the second pathloss mode.

The first pathloss communicator 1130 may communicate with a second wireless device operating in the first pathloss mode via the one or more first sets of resources.

The second pathloss communicator 1135 may communicate with a third wireless device operating in the second pathloss mode via the one or more second sets of resources.

The first pathloss link manager 1120 may configure one or more sets of resources of a radio frequency spectrum band for communications associated with a first pathloss mode, where a first length of a first TTI associated with the first pathloss mode is different from a second length of a second TTI associated with a second pathloss mode.

The first pathloss communicator 1130 may communicate with a second wireless device in the first pathloss mode using a communication link via the one or more sets of resources.

Transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 or 1420 as described with reference to FIGS. 13 and 14. The transmitter 1140 may utilize a single antenna or a set of antennas.

Figure 12:
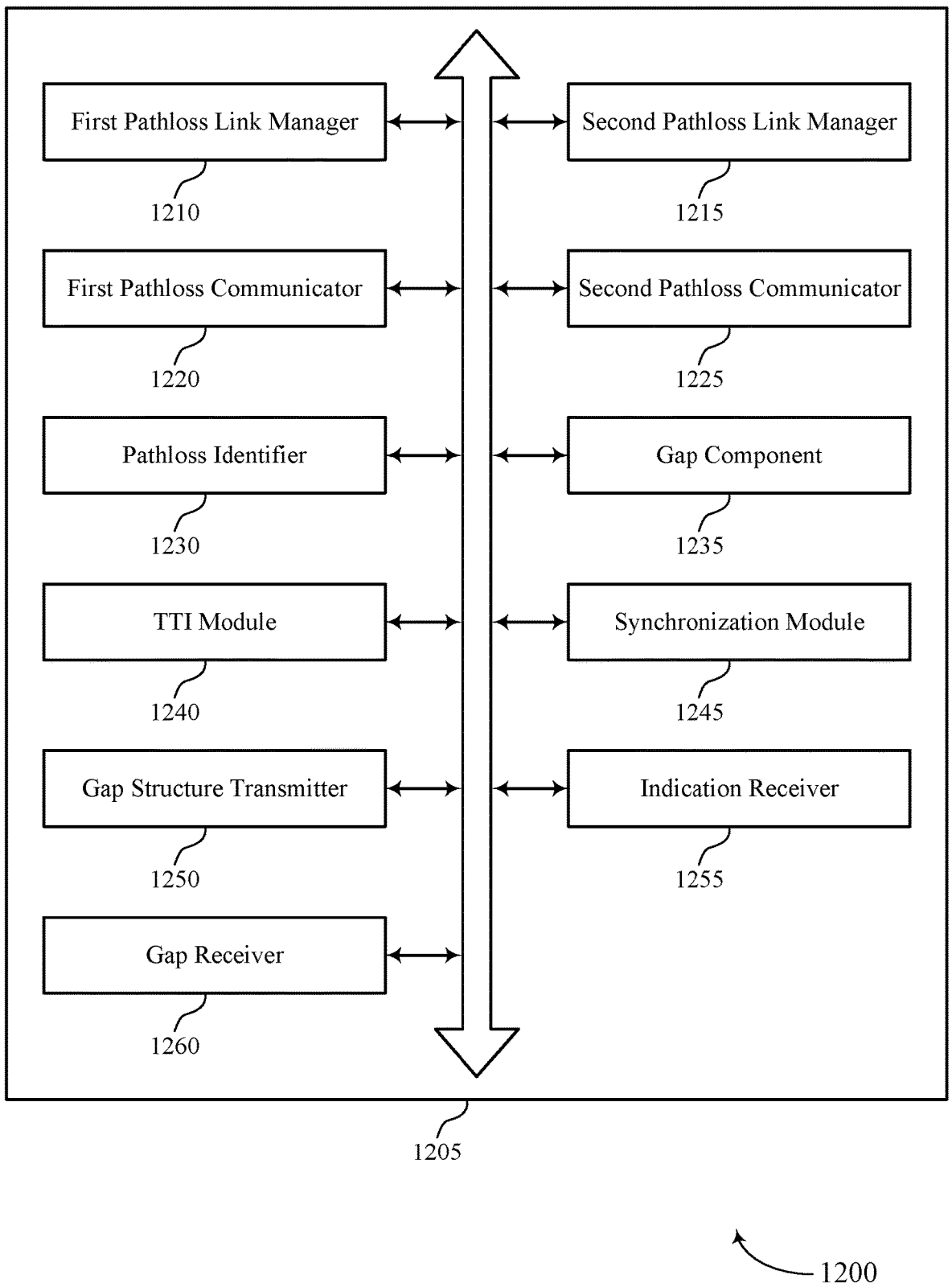
FIG. 12 shows a block diagram of a communications manager that supports high pathloss mode multiplexing in accordance with one or more aspects of the present disclosure.

FIG. 12 shows a block diagram 1200 of a communications manager 1205 that supports high pathloss mode multiplexing in accordance with one or more aspects of the present disclosure. The communications manager 1205 may be an example of aspects of a communications manager 1015, a communications manager 1115, or a communications manager 1310 described herein. The communications manager 1205 may include a first pathloss link manager 1210, a second pathloss link manager 1215, a first pathloss communicator 1220, a second pathloss communicator 1225, a pathloss identifier 1230, a gap component 1235, a TTI module 1240, a synchronization module 1245, a gap structure transmitter 1250, an indication receiver 1255, and a gap receiver 1260. Each of these modules may communicate, directly or indirectly, with one another (e.g., via one or more buses).

The first pathloss link manager 1210 may configure one or more first sets of resources of a radio frequency spectrum band for communications associated with a first pathloss mode. In some examples, the first pathloss link manager 1210 may configure one or more sets of resources of a radio frequency spectrum band for communications associated with a first pathloss mode, where a first length of a first TTI associated with the first pathloss mode is different from a second length of a second TTI associated with a second pathloss mode. In some cases, the first pathloss link manager 1210 may configure a first subset of a set of communication links supported by the first wireless device for the first pathloss mode. In some aspects, the first pathloss link manager 1210 may configure a first set of gaps, a first set of TTIs associated with transmission, and a first set of TTIs associated with reception for communications of the first pathloss mode via the one or more first sets of resources. In some instances, the one or more first sets of resources is associated with a first set of time resources and a first set of frequency resources.

The second pathloss link manager 1215 may configure one or more second sets of resources of the radio frequency spectrum band for communications associated with a second pathloss mode, where a first length of a first TTI associated with the first pathloss mode is different from a second length of a second TTI associated with the second pathloss mode. In some examples, the second pathloss link manager 1215 may configure a second subset of the set of communication links supported by the first wireless device for the second pathloss mode. In some cases, the second pathloss link manager 1215 may configure a second set of gaps, a second set of TTIs associated with transmission, and a second set of TTIs associated with reception for communications of the second pathloss mode via the one or more second sets of resources. In some aspects, the second pathloss link manager 1215 may configure one or more second sets of resources of the radio frequency spectrum band for communications associated with the second pathloss mode. In some instances, the one or more second sets of resources is associated with at least a portion of the first set of time resources and a second set of frequency resources different from the first set of frequency resources.

In some cases, the one or more second sets of resources is associated with a second set of time resources different from the first set of time resources and at least a portion of the first set of frequency resources. In some examples, the one or more second sets of resources is associated with a second set of time resources different from the first set of time resources and a second set of frequency resources different from the first set of frequency resources. In some instances, the one or more first sets of resources and the one or more second sets of resources are the same. In some aspects, the first pathloss mode is a high pathloss mode and the second pathloss mode is a normal mode.

The first pathloss communicator 1220 may communicate with a second wireless device operating in the first pathloss mode via the one or more first sets of resources. In some examples, the first pathloss communicator 1220 may communicate with a second wireless device in the first pathloss mode using a communication link via the one or more sets of resources. In some aspects, the first pathloss communicator 1220 may communicate with the second wireless device according to a first spatial stream. In some cases, the first pathloss communicator 1220 may communicate with the second wireless device operating in the first pathloss mode via a first communication link associated with the one or more first sets of resources, where the first communication link is configured for one of transmission or reception.

The second pathloss communicator 1225 may communicate with a third wireless device operating in the second pathloss mode via the one or more second sets of resources. In some examples, the second pathloss communicator 1225 may communicate with the third wireless device according to a second spatial stream different from the first spatial stream. In some aspects, the second pathloss communicator 1225 may communicate with the third wireless device operating in the second pathloss mode via a second communication link associated with the one or more second sets of resources, where the second communication link is configured for one of transmission or reception independent of the first communication link. In some cases, the second pathloss communicator 1225 may communicate with the second wireless device in the second pathloss mode using a second communication link via the one or more second sets of resources.

In some examples, the second pathloss communicator 1225 may communicate with the second wireless device in the second pathloss mode based on the indication. In some examples, the second pathloss communicator 1225 may communicate with the second wireless device based on the gap structure. In some cases, the first, second, and third wireless devices are IAB nodes operating in an IAB network.

The pathloss identifier 1230 may identify a pathloss associated with the first subset of the set of communication links, where the first subset of the set of communication links is configured based on the identified pathloss.

The gap component 1235 may configure a set of gaps for communications of the first pathloss mode via the one or more first sets of resources.

The TTI module 1240 may configure a set of TTIs for communications of the second pathloss mode via the one or more second sets of resources.

The synchronization module 1245 may synchronize the set of gaps corresponding to the first pathloss mode with the set of TTIs corresponding to the second pathloss mode. In some examples, the synchronization module 1245 may synchronize the first and the second sets of gaps, the first and the second sets of TTIs associated with transmission, and the first and the second sets of TTIs associated with reception.

The gap structure transmitter 1250 may transmit a gap structure associated with the set of gaps, where the gap structure indicates respective locations and lengths corresponding to the set of gaps. In some examples, the gap structure transmitter 1250 may transmit the gap structure via a SFI. In some cases, the gap structure transmitter 1250 may transmit a gap structure indicating respective locations and lengths for one or more gaps of the first set of gaps or the second set of gaps, or both.

The indication receiver 1255 may receive, from the second wireless device, an indication to switch from the first pathloss mode to the second pathloss mode.

The gap receiver 1260 may receive, from the second wireless device, a gap structure associated with one or more gaps for the first pathloss mode, where the gap structure indicates respective locations and lengths corresponding to the one or more gaps. In some examples, the gap receiver 1260 may receive the gap structure via a SFI.

Figure 13:
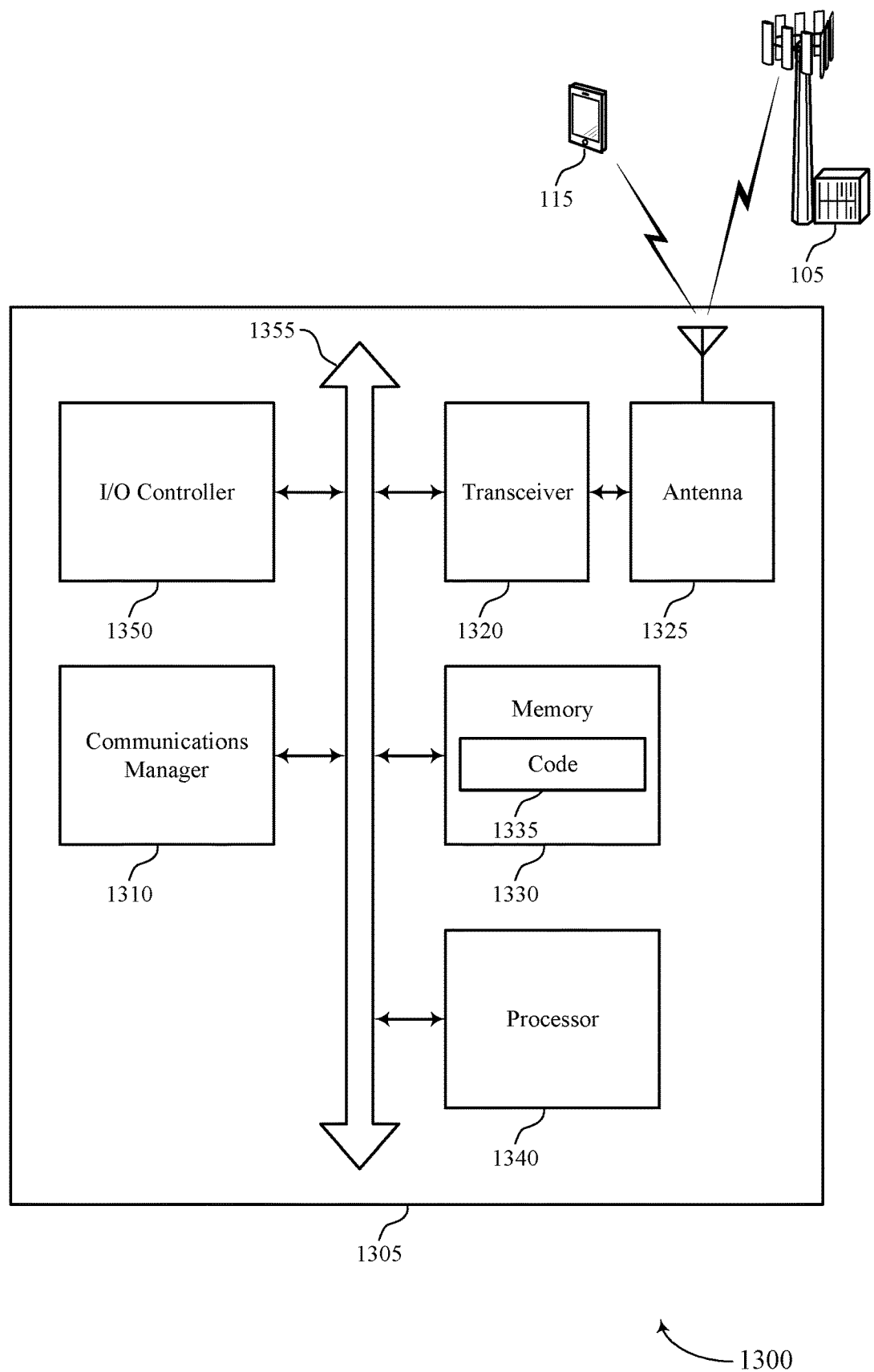
FIG. 13 shows a diagram of a system including a UE that supports high pathloss mode multiplexing in accordance with one or more aspects of the present disclosure.

FIG. 13 shows a diagram of a system 1300 including a device 1305 that supports high pathloss mode multiplexing in accordance with one or more aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, a transceiver 1320, an antenna 1325, memory 1330, a processor 1340, and an I/O controller 1350. These components may be in electronic communication via one or more buses (e.g., bus 1355).

The communications manager 1310 may configure one or more first sets of resources of a radio frequency spectrum band for communications associated with a first pathloss mode, configure one or more second sets of resources of the radio frequency spectrum band for communications associated with a second pathloss mode, where a first length of a first TTI associated with the first pathloss mode is different from a second length of a second TTI associated with the second pathloss mode, communicate with a second wireless device operating in the first pathloss mode via the one or more first sets of resources, and communicate with a third wireless device operating in the second pathloss mode via the one or more second sets of resources.

Additionally, or alternatively, the communications manager 1310 may also configure one or more sets of resources of a radio frequency spectrum band for communications associated with a first pathloss mode, where a first length of a first TTI associated with the first pathloss mode is different from a second length of a second TTI associated with a second pathloss mode and communicate with a second wireless device in the first pathloss mode using a communication link via the one or more sets of resources.

Transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the device 1305 may include a single antenna 1325, or the device 1305 may have more than one antenna 1325, which may be capable of concurrently transmitting or receiving multiple wireless transmissions.

The memory 1330 may include random access memory (RAM), read only memory (ROM), or a combination thereof. The memory 1330 may store computer-readable code 1335 including instructions that, when executed by a processor (e.g., the processor 1340) cause the device to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting high pathloss mode multiplexing).

The I/O controller 1350 may manage input and output signals for the device 1305. The I/O controller 1350 may also manage peripherals not integrated into the device 1305. In some cases, the I/O controller 1350 may represent a physical connection or port to an external peripheral. In some cases, the I/O controller 1350 may utilize an operating system such as iOS®, ANDROID®, MS-DOS®, MS-WINDOWS®, OS/2®, UNIX®, LINUX®, or another known operating system. In other cases, the I/O controller 1350 may represent or interact with a modem, a keyboard, a mouse, a touchscreen, or a similar device. In some cases, the I/O controller 1350 may be implemented as part of a processor. In some cases, a user may interact with the device 1305 via the I/O controller 1350 or via hardware components controlled by the I/O controller 1350.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
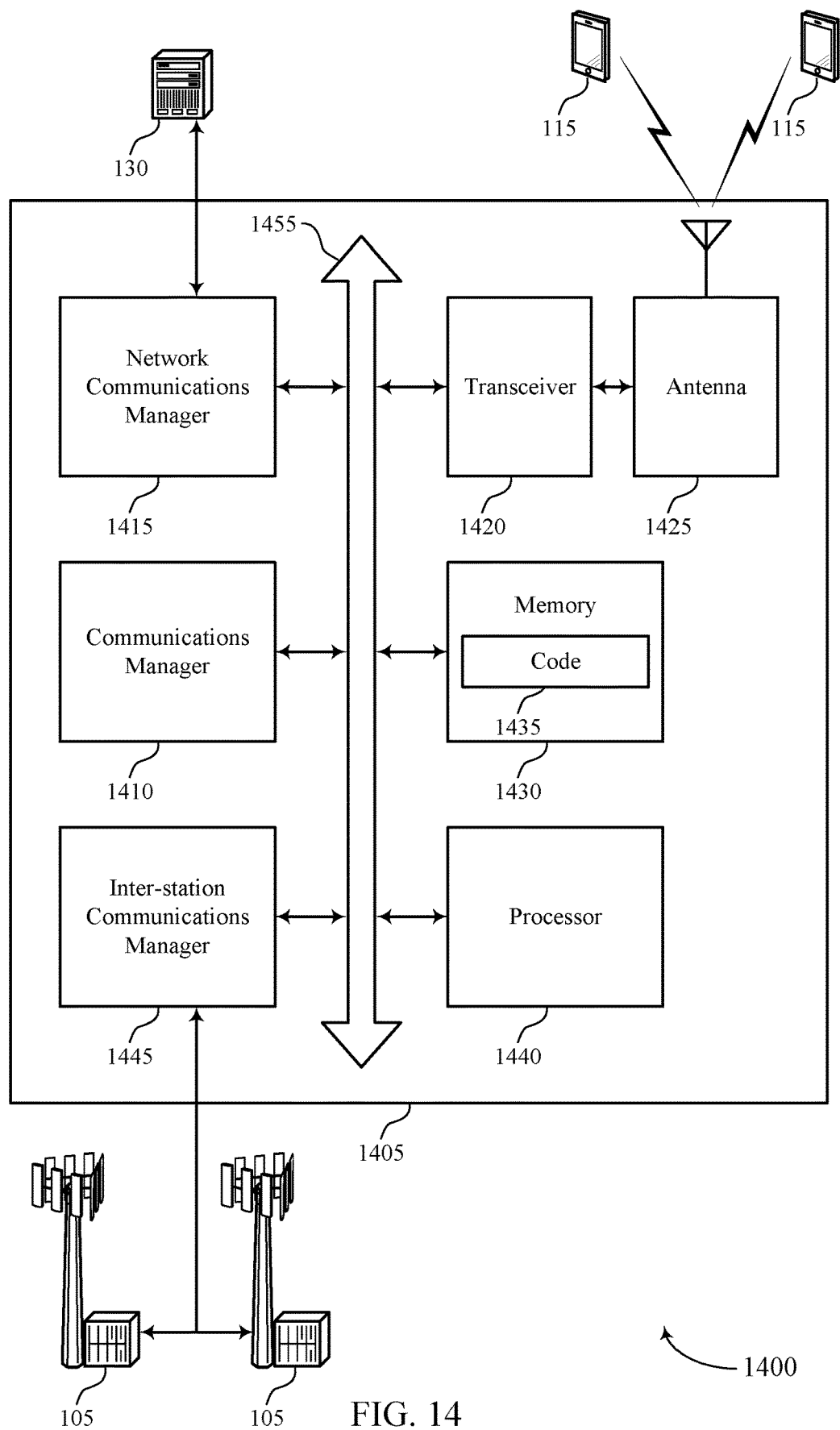
FIG. 14 shows a diagram of a system including a base station that supports high pathloss mode multiplexing in accordance with one or more aspects of the present disclosure.

FIG. 14 shows a diagram of a system 1400 including a device 1405 that supports high pathloss mode multiplexing in accordance with one or more aspects of the present disclosure. The device 1405 may be an example of or include the components of device 1005, device 1105, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1455).

The communications manager 1410 may configure one or more first sets of resources of a radio frequency spectrum band for communications associated with a first pathloss mode, configure one or more second sets of resources of the radio frequency spectrum band for communications associated with a second pathloss mode, where a first length of a first TTI associated with the first pathloss mode is different from a second length of a second TTI associated with the second pathloss mode, communicate with a second wireless device operating in the first pathloss mode via the one or more first sets of resources, and communicate with a third wireless device operating in the second pathloss mode via the one or more second sets of resources.

Additionally, or alternatively, the communications manager 1410 may also configure one or more sets of resources of a radio frequency spectrum band for communications associated with a first pathloss mode, where a first length of a first TTI associated with the first pathloss mode is different from a second length of a second TTI associated with a second pathloss mode and communicate with a second wireless device in the first pathloss mode using a communication link via the one or more sets of resources.

Network communications manager 1415 may manage communications with the core network (e.g., via one or more wired backhaul links). For example, the network communications manager 1415 may manage the transfer of data communications for client devices, such as one or more UEs 115.

Transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the device 1405 may include a single antenna 1425, or may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting high pathloss mode multiplexing).

Inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
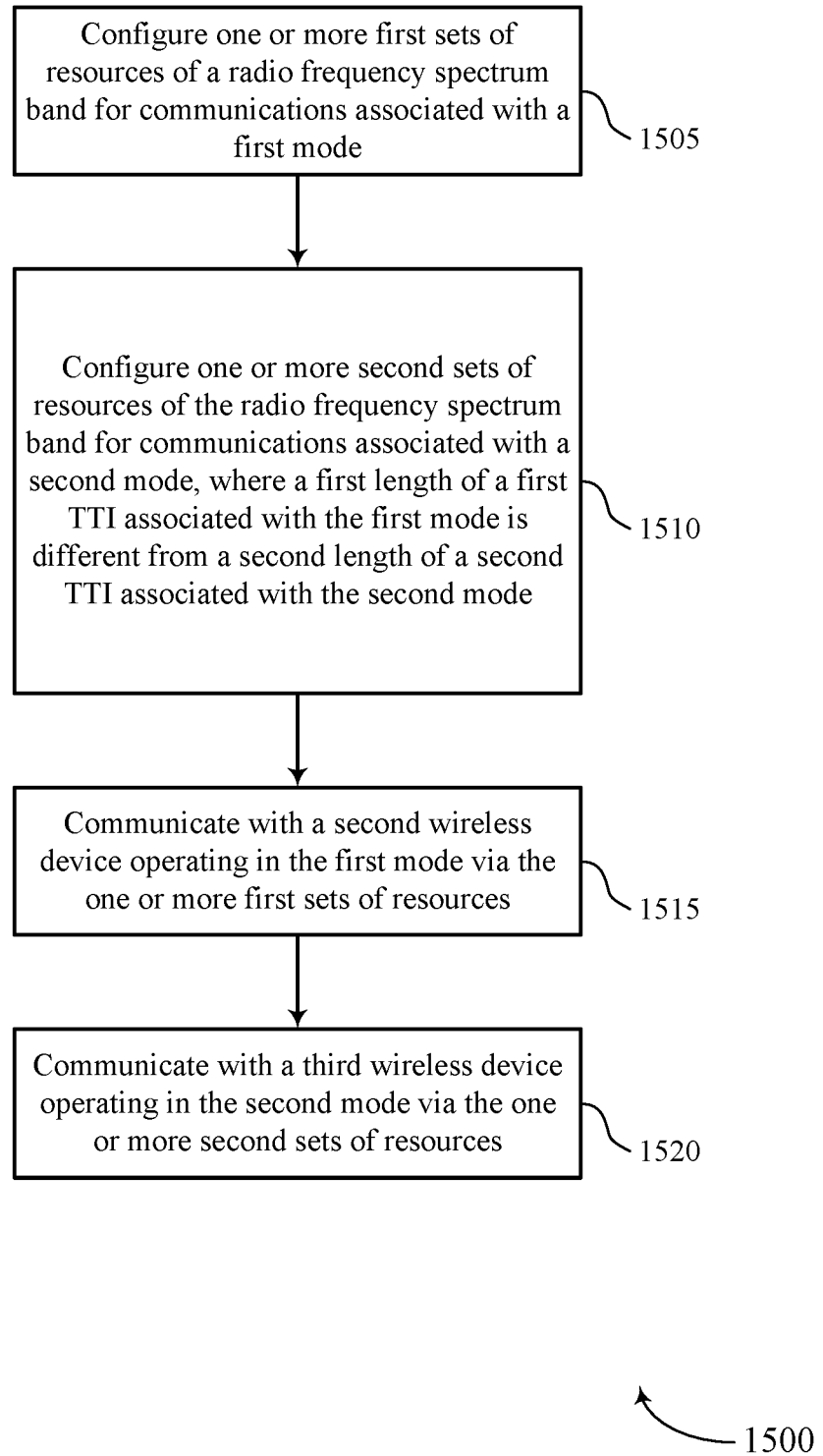
FIGS. 15-21 show flowcharts illustrating methods that support high pathloss mode multiplexing in accordance with one or more aspects of the present disclosure.

FIG. 15 shows a flowchart illustrating a method 1500 that supports high pathloss mode multiplexing in accordance with one or more aspects of the present disclosure. The operations of method 1500 may be implemented by a UE 115 or base station 105 or its components as described herein. For example, the operations of method 1500 may be performed by a communications manager as described with reference to FIGS. 10-14. In some examples, a UE or base station may execute a set of instructions to control the functional elements of the UE or base station to perform the functions described herein. Additionally or alternatively, a UE or base station may perform aspects of the functions described herein using special-purpose hardware.

At 1505, the UE or base station may configure one or more first sets of resources of a radio frequency spectrum band for communications associated with a first pathloss mode. The operations of 1505 may be performed according to the methods described herein. In some examples, aspects of the operations of 1505 may be performed by a first pathloss link manager as described with reference to FIGS. 10-14.

At 1510, the UE or base station may configure one or more second sets of resources of the radio frequency spectrum band for communications associated with a second pathloss mode, where a first length of a first TTI associated with the first pathloss mode is different from a second length of a second TTI associated with the second pathloss mode. The operations of 1510 may be performed according to the methods described herein. In some examples, aspects of the operations of 1510 may be performed by a second pathloss link manager as described with reference to FIGS. 10-14.

At 1515, the UE or base station may communicate with a second wireless device operating in the first pathloss mode via the one or more first sets of resources. The operations of 1515 may be performed according to the methods described herein. In some examples, aspects of the operations of 1515 may be performed by a first pathloss communicator as described with reference to FIGS. 10-14.

At 1520, the UE or base station may communicate with a third wireless device operating in the second pathloss mode via the one or more second sets of resources. The operations of 1520 may be performed according to the methods described herein. In some examples, aspects of the operations of 1520 may be performed by a second pathloss communicator as described with reference to FIGS. 10-14.

Figure 16:
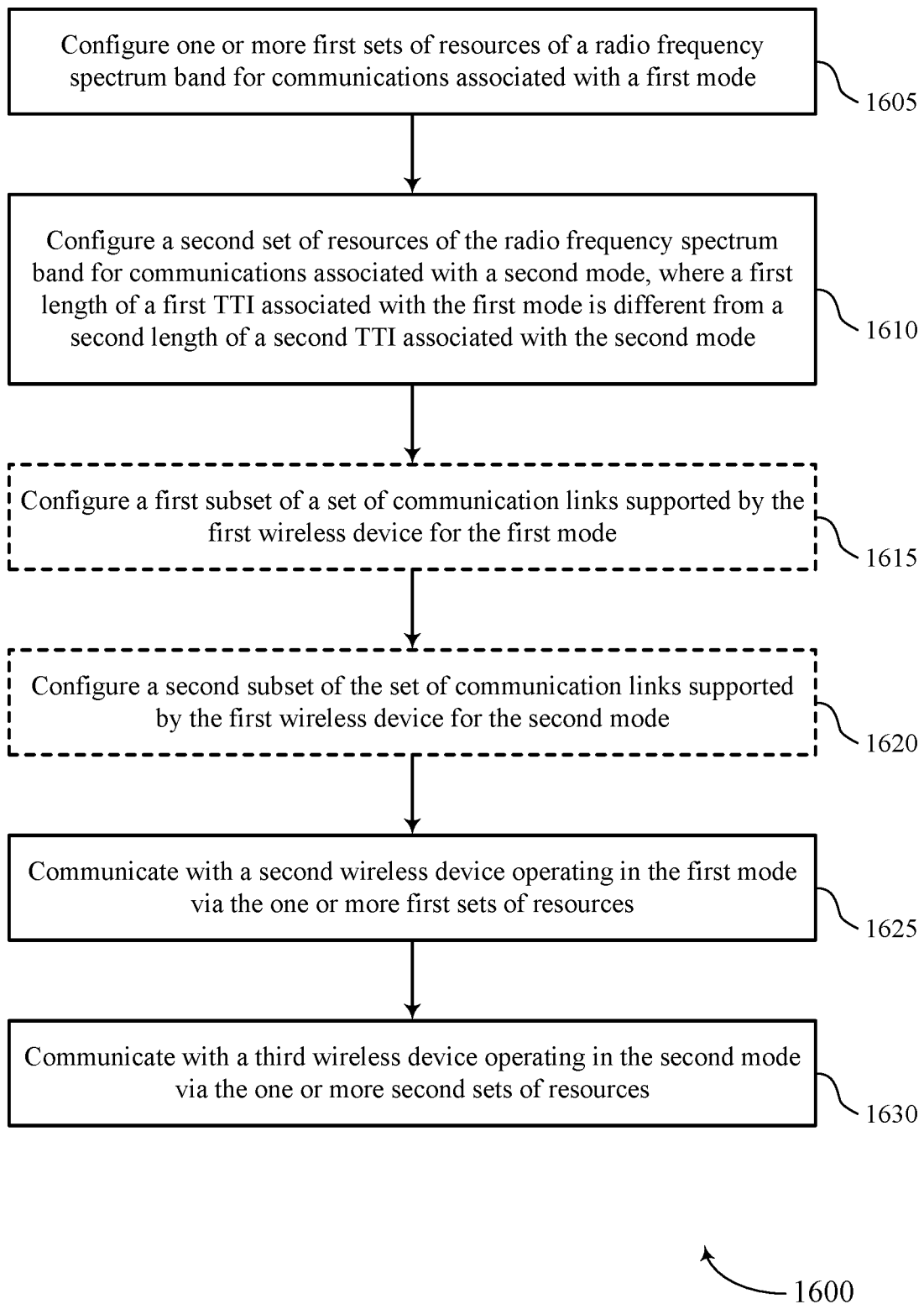

FIG. 16 shows a flowchart illustrating a method 1600 that supports high pathloss mode multiplexing in accordance with one or more aspects of the present disclosure. The operations of method 1600 may be implemented by a UE 115 or base station 105 or its components as described herein. For example, the operations of method 1600 may be performed by a communications manager as described with reference to FIGS. 10-14. In some examples, a UE or base station may execute a set of instructions to control the functional elements of the UE or base station to perform the functions described herein. Additionally or alternatively, a UE or base station may perform aspects of the functions described herein using special-purpose hardware.

At 1605, the UE or base station may configure one or more first sets of resources of a radio frequency spectrum band for communications associated with a first pathloss mode. The operations of 1605 may be performed according to the methods described herein. In some examples, aspects of the operations of 1605 may be performed by a first pathloss link manager as described with reference to FIGS. 10-14.

At 1610, the UE or base station may configure one or more second sets of resources of the radio frequency spectrum band for communications associated with a second pathloss mode, where a first length of a first TTI associated with the first pathloss mode is different from a second length of a second TTI associated with the second pathloss mode. The operations of 1610 may be performed according to the methods described herein. In some examples, aspects of the operations of 1610 may be performed by a second pathloss link manager as described with reference to FIGS. 10-14.

At 1615, the UE or base station may configure a first subset of a set of communication links supported by the first wireless device for the first pathloss mode. The operations of 1615 may be performed according to the methods described herein. In some examples, aspects of the operations of 1615 may be performed by a first pathloss link manager as described with reference to FIGS. 10-14.

At 1620, the UE or base station may configure a second subset of the set of communication links supported by the first wireless device for the second pathloss mode. The operations of 1620 may be performed according to the methods described herein. In some examples, aspects of the operations of 1620 may be performed by a second pathloss link manager as described with reference to FIGS. 10-14.

At 1625, the UE or base station may communicate with a second wireless device operating in the first pathloss mode via the one or more first sets of resources. The operations of 1625 may be performed according to the methods described herein. In some examples, aspects of the operations of 1625 may be performed by a first pathloss communicator as described with reference to FIGS. 10-14.

At 1630, the UE or base station may communicate with a third wireless device operating in the second pathloss mode via the one or more second sets of resources. The operations of 1630 may be performed according to the methods described herein. In some examples, aspects of the operations of 1630 may be performed by a second pathloss communicator as described with reference to FIGS. 10-14.

Figure 17:
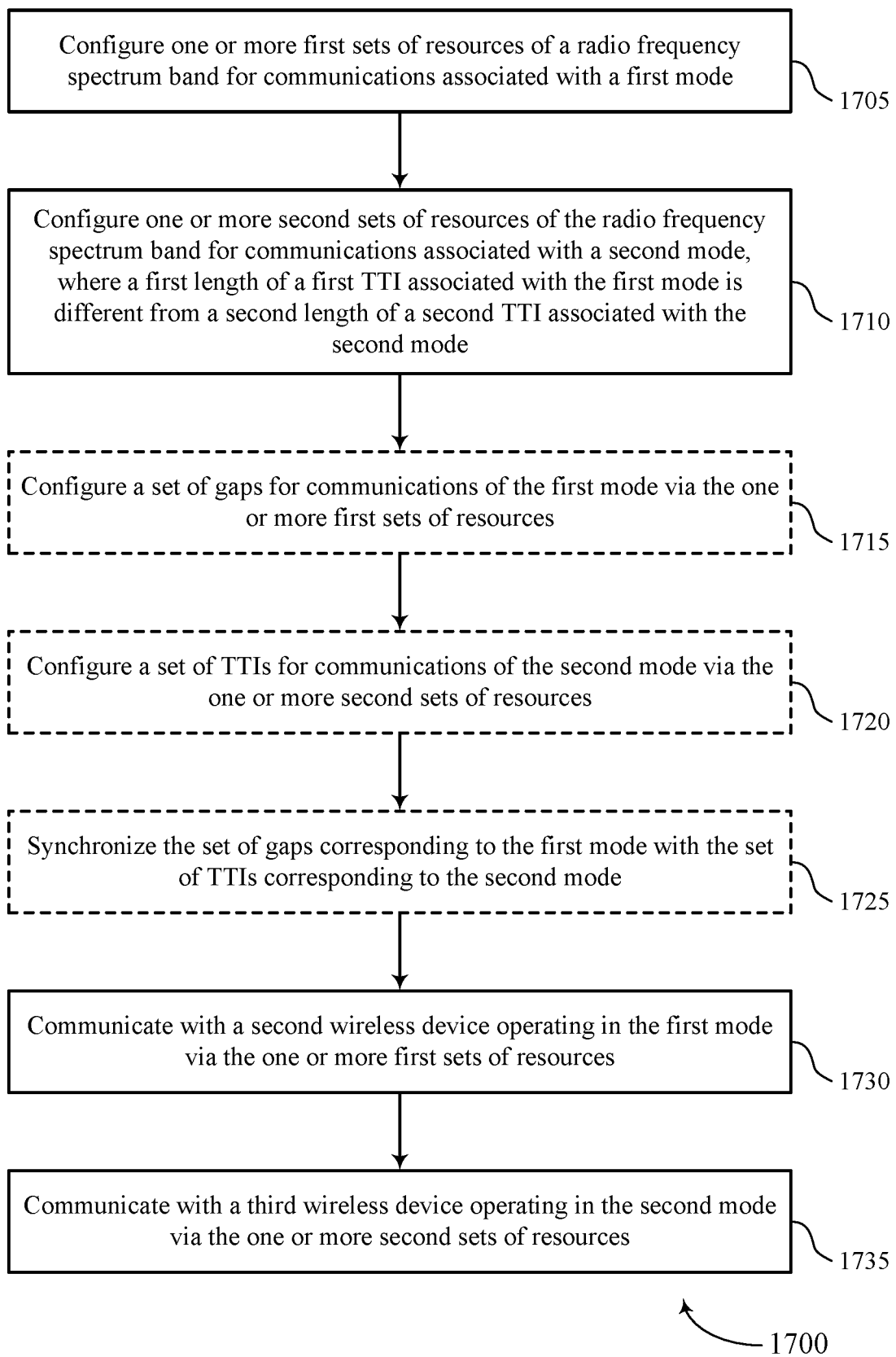

FIG. 17 shows a flowchart illustrating a method 1700 that supports high pathloss mode multiplexing in accordance with one or more aspects of the present disclosure. The operations of method 1700 may be implemented by a UE 115 or base station 105 or its components as described herein. For example, the operations of method 1700 may be performed by a communications manager as described with reference to FIGS. 10-14. In some examples, a UE or base station may execute a set of instructions to control the functional elements of the UE or base station to perform the functions described herein. Additionally or alternatively, a UE or base station may perform aspects of the functions described herein using special-purpose hardware.

At 1705, the UE or base station may configure one or more first sets of resources of a radio frequency spectrum band for communications associated with a first pathloss mode. The operations of 1705 may be performed according to the methods described herein. In some examples, aspects of the operations of 1705 may be performed by a first pathloss link manager as described with reference to FIGS. 10-14.

At 1710, the UE or base station may configure one or more second sets of resources of the radio frequency spectrum band for communications associated with a second pathloss mode, where a first length of a first TTI associated with the first pathloss mode is different from a second length of a second TTI associated with the second pathloss mode. The operations of 1710 may be performed according to the methods described herein. In some examples, aspects of the operations of 1710 may be performed by a second pathloss link manager as described with reference to FIGS. 10-14.

At 1715, the UE or base station may configure a set of gaps for communications of the first pathloss mode via the one or more first sets of resources. The operations of 1715 may be performed according to the methods described herein. In some examples, aspects of the operations of 1715 may be performed by a gap component as described with reference to FIGS. 10-14.

At 1720, the UE or base station may configure a set of TTIs for communications of the second pathloss mode via the one or more second sets of resources. The operations of 1720 may be performed according to the methods described herein. In some examples, aspects of the operations of 1720 may be performed by a TTI module as described with reference to FIGS. 10-14.

At 1725, the UE or base station may synchronize the set of gaps corresponding to the first pathloss mode with the set of TTIs corresponding to the second pathloss mode. The operations of 1725 may be performed according to the methods described herein. In some examples, aspects of the operations of 1725 may be performed by a synchronization module as described with reference to FIGS. 10-14.

At 1730, the UE or base station may communicate with a second wireless device operating in the first pathloss mode via the one or more first sets of resources. The operations of 1730 may be performed according to the methods described herein. In some examples, aspects of the operations of 1730 may be performed by a first pathloss communicator as described with reference to FIGS. 10-14.

At 1735, the UE or base station may communicate with a third wireless device operating in the second pathloss mode via the one or more second sets of resources. The operations of 1735 may be performed according to the methods described herein. In some examples, aspects of the operations of 1735 may be performed by a second pathloss communicator as described with reference to FIGS. 10-14.

Figure 18:
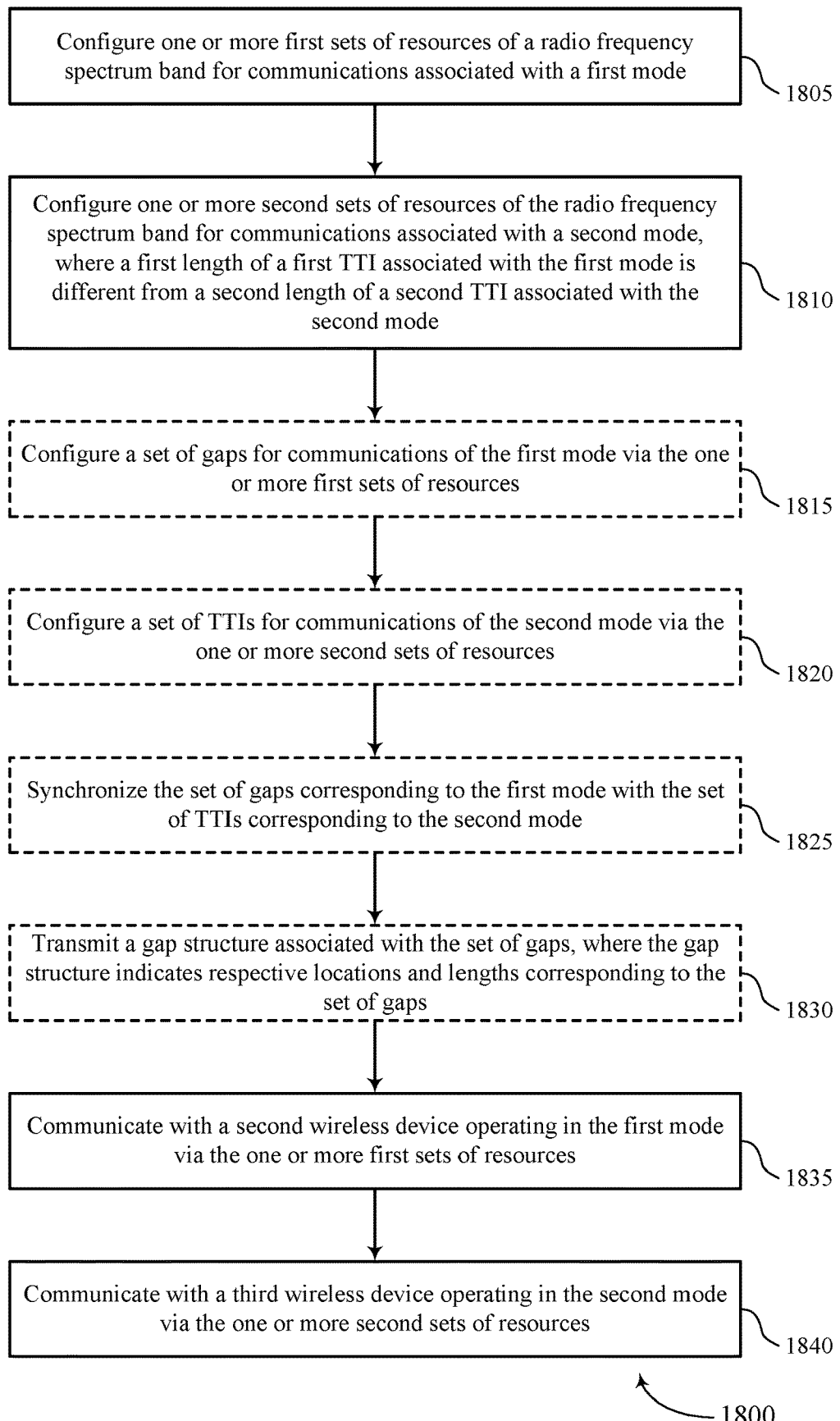

FIG. 18 shows a flowchart illustrating a method 1800 that supports high pathloss mode multiplexing in accordance with one or more aspects of the present disclosure. The operations of method 1800 may be implemented by a UE 115 or base station 105 or its components as described herein. For example, the operations of method 1800 may be performed by a communications manager as described with reference to FIGS. 10-14. In some examples, a UE or base station may execute a set of instructions to control the functional elements of the UE or base station to perform the functions described herein. Additionally or alternatively, a UE or base station may perform aspects of the functions described herein using special-purpose hardware.

At 1805, the UE or base station may configure one or more first sets of resources of a radio frequency spectrum band for communications associated with a first pathloss mode. The operations of 1805 may be performed according to the methods described herein. In some examples, aspects of the operations of 1805 may be performed by a first pathloss link manager as described with reference to FIGS. 10-14.

At 1810, the UE or base station may configure one or more second sets of resources of the radio frequency spectrum band for communications associated with a second pathloss mode, where a first length of a first TTI associated with the first pathloss mode is different from a second length of a second TTI associated with the second pathloss mode. The operations of 1810 may be performed according to the methods described herein. In some examples, aspects of the operations of 1810 may be performed by a second pathloss link manager as described with reference to FIGS. 10-14.

At 1815, the UE or base station may configure a set of gaps for communications of the first pathloss mode via the one or more first sets of resources. The operations of 1815 may be performed according to the methods described herein. In some examples, aspects of the operations of 1815 may be performed by a gap component as described with reference to FIGS. 10-14.

At 1820, the UE or base station may configure a set of TTIs for communications of the second pathloss mode via the one or more second sets of resources. The operations of 1820 may be performed according to the methods described herein. In some examples, aspects of the operations of 1820 may be performed by a TTI module as described with reference to FIGS. 10-14.

At 1825, the UE or base station may synchronize the set of gaps corresponding to the first pathloss mode with the set of TTIs corresponding to the second pathloss mode. The operations of 1825 may be performed according to the methods described herein. In some examples, aspects of the operations of 1825 may be performed by a synchronization module as described with reference to FIGS. 10-14.

At 1830, the UE or base station may transmit a gap structure associated with the set of gaps, where the gap structure indicates respective locations and lengths corresponding to the set of gaps. The operations of 1830 may be performed according to the methods described herein. In some examples, aspects of the operations of 1830 may be performed by a gap structure transmitter as described with reference to FIGS. 10-14.

At 1835, the UE or base station may communicate with a second wireless device operating in the first pathloss mode via the one or more first sets of resources. The operations of 1835 may be performed according to the methods described herein. In some examples, aspects of the operations of 1835 may be performed by a first pathloss communicator as described with reference to FIGS. 10-14.

At 1840, the UE or base station may communicate with a third wireless device operating in the second pathloss mode via the one or more second sets of resources. The operations of 1840 may be performed according to the methods described herein. In some examples, aspects of the operations of 1840 may be performed by a second pathloss communicator as described with reference to FIGS. 10-14.

Figure 19:
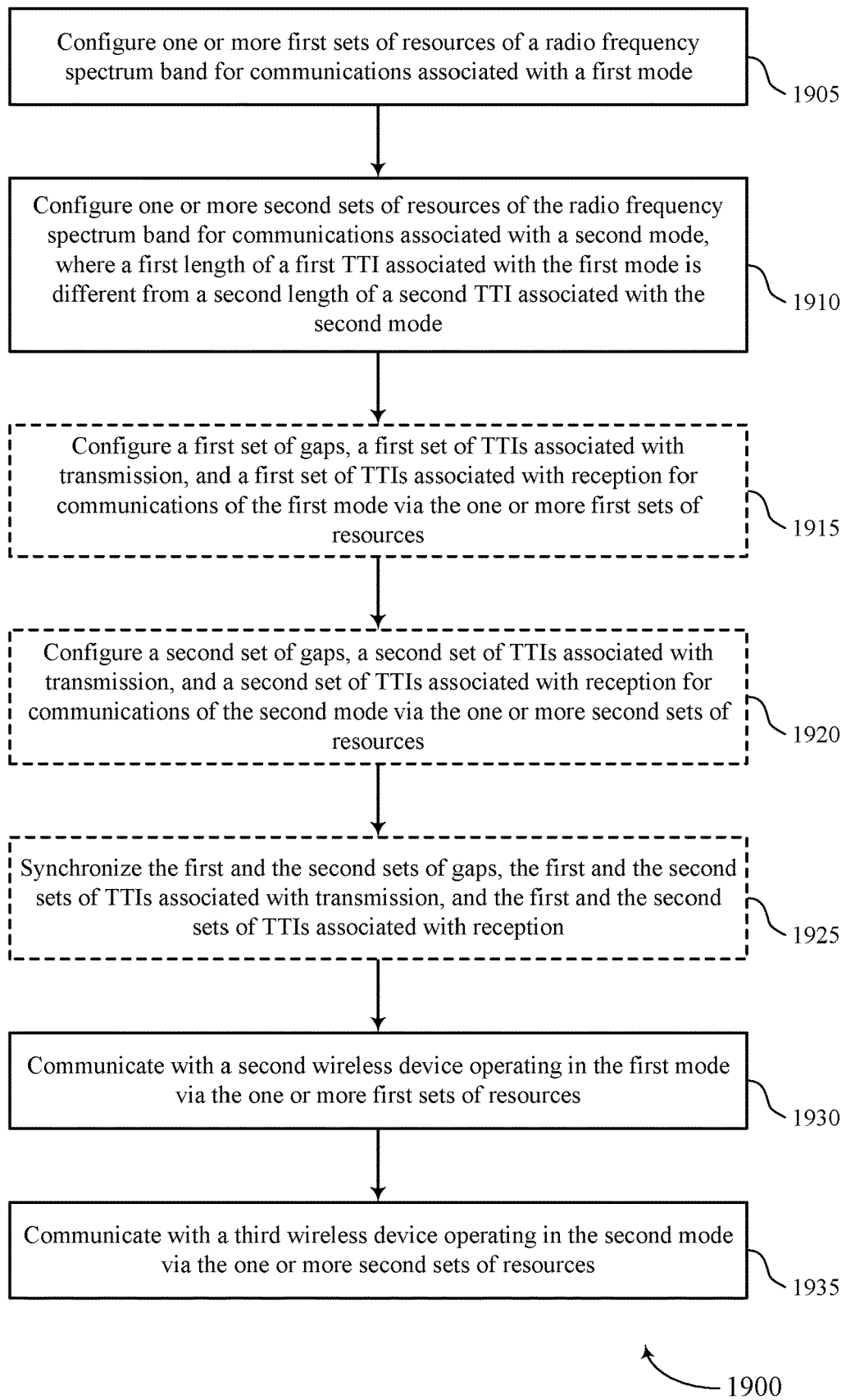

FIG. 19 shows a flowchart illustrating a method 1900 that supports high pathloss mode multiplexing in accordance with one or more aspects of the present disclosure. The operations of method 1900 may be implemented by a UE 115 or base station 105 or its components as described herein. For example, the operations of method 1900 may be performed by a communications manager as described with reference to FIGS. 10-14. In some examples, a UE or base station may execute a set of instructions to control the functional elements of the UE or base station to perform the functions described herein. Additionally or alternatively, a UE or base station may perform aspects of the functions described herein using special-purpose hardware.

At 1905, the UE or base station may configure one or more first sets of resources of a radio frequency spectrum band for communications associated with a first pathloss mode. The operations of 1905 may be performed according to the methods described herein. In some examples, aspects of the operations of 1905 may be performed by a first pathloss link manager as described with reference to FIGS. 10-14.

At 1910, the UE or base station may configure one or more second sets of resources of the radio frequency spectrum band for communications associated with a second pathloss mode, where a first length of a first TTI associated with the first pathloss mode is different from a second length of a second TTI associated with the second pathloss mode. The operations of 1910 may be performed according to the methods described herein. In some examples, aspects of the operations of 1910 may be performed by a second pathloss link manager as described with reference to FIGS. 10-14.

At 1915, the UE or base station may configure a first set of gaps, a first set of TTIs associated with transmission, and a first set of TTIs associated with reception for communications of the first pathloss mode via the one or more first sets of resources. The operations of 1915 may be performed according to the methods described herein. In some examples, aspects of the operations of 1915 may be performed by a first pathloss link manager as described with reference to FIGS. 10-14.

At 1920, the UE or base station may configure a second set of gaps, a second set of TTIs associated with transmission, and a second set of TTIs associated with reception for communications of the second pathloss mode via the one or more second sets of resources. The operations of 1920 may be performed according to the methods described herein. In some examples, aspects of the operations of 1920 may be performed by a second pathloss link manager as described with reference to FIGS. 10-14.

At 1925, the UE or base station may synchronize the first and the second sets of gaps, the first and the second sets of TTIs associated with transmission, and the first and the second sets of TTIs associated with reception. The operations of 1925 may be performed according to the methods described herein. In some examples, aspects of the operations of 1925 may be performed by a synchronization module as described with reference to FIGS. 10-14.

At 1930, the UE or base station may configure a set of gaps for communications of the first pathloss mode via the one or more first sets of resources. The operations of 1930 may be performed according to the methods described herein. In some examples, aspects of the operations of 1930 may be performed by a gap component as described with reference to FIGS. 10-14.

At 1935, the UE or base station may configure a set of TTIs for communications of the second pathloss mode via the one or more second sets of resources. The operations of 1935 may be performed according to the methods described herein. In some examples, aspects of the operations of 1935 may be performed by a TTI module as described with reference to FIGS. 10-14.

At 1940, the UE or base station may synchronize the set of gaps corresponding to the first pathloss mode with the set of TTIs corresponding to the second pathloss mode. The operations of 1940 may be performed according to the methods described herein. In some examples, aspects of the operations of 1940 may be performed by a synchronization module as described with reference to FIGS. 10-14.

At 1945, the UE or base station may communicate with a second wireless device operating in the first pathloss mode via the one or more first sets of resources. The operations of 1945 may be performed according to the methods described herein. In some examples, aspects of the operations of 1945 may be performed by a first pathloss communicator as described with reference to FIGS. 10-14.

At 1950, the UE or base station may communicate with a third wireless device operating in the second pathloss mode via the one or more second sets of resources. The operations of 1950 may be performed according to the methods described herein. In some examples, aspects of the operations of 1950 may be performed by a second pathloss communicator as described with reference to FIGS. 10-14.

Figure 20:
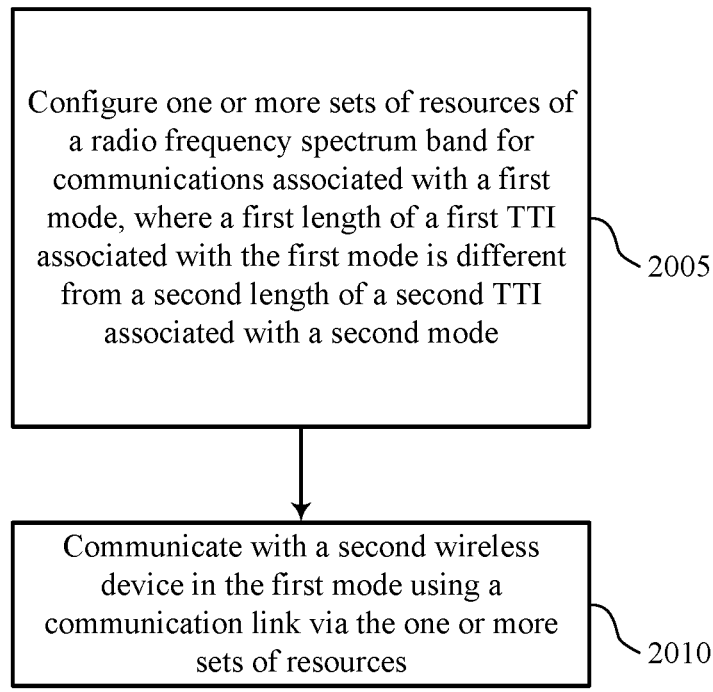

FIG. 20 shows a flowchart illustrating a method 2000 that supports high pathloss mode multiplexing in accordance with one or more aspects of the present disclosure. The operations of method 2000 may be implemented by a UE 115 or base station 105 or its components as described herein. For example, the operations of method 2000 may be performed by a communications manager as described with reference to FIGS. 10-14. In some examples, a UE or base station may execute a set of instructions to control the functional elements of the UE or base station to perform the functions described herein. Additionally or alternatively, a UE or base station may perform aspects of the functions described herein using special-purpose hardware.

At 2005, the UE or base station may configure one or more sets of resources of a radio frequency spectrum band for communications associated with a first pathloss mode, where a first length of a first TTI associated with the first pathloss mode is different from a second length of a second TTI associated with a second pathloss mode. The operations of 2005 may be performed according to the methods described herein. In some examples, aspects of the operations of 2005 may be performed by a first pathloss link manager as described with reference to FIGS. 10-14.

At 2010, the UE or base station may communicate with a second wireless device in the first pathloss mode using a communication link via the one or more sets of resources. The operations of 2010 may be performed according to the methods described herein. In some examples, aspects of the operations of 2010 may be performed by a first pathloss communicator as described with reference to FIGS. 10-14.

Figure 21:
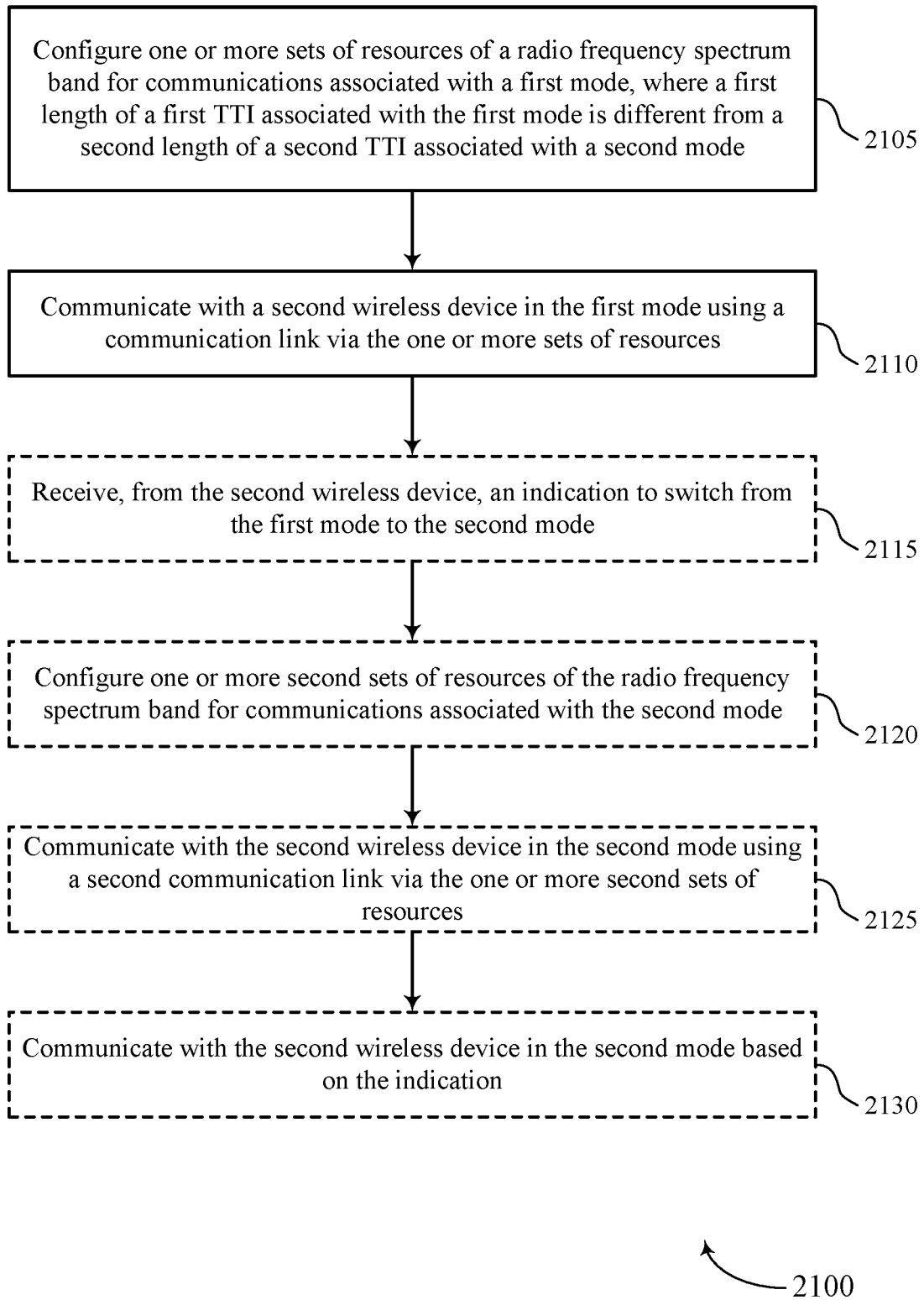

FIG. 21 shows a flowchart illustrating a method 2100 that supports high pathloss mode multiplexing in accordance with one or more aspects of the present disclosure. The operations of method 2100 may be implemented by a UE 115 or base station 105 or its components as described herein. For example, the operations of method 2100 may be performed by a communications manager as described with reference to FIGS. 10-14. In some examples, a UE or base station may execute a set of instructions to control the functional elements of the UE or base station to perform the functions described herein. Additionally or alternatively, a UE or base station may perform aspects of the functions described herein using special-purpose hardware.

At 2105, the UE or base station may configure one or more sets of resources of a radio frequency spectrum band for communications associated with a first pathloss mode, where a first length of a first TTI associated with the first pathloss mode is different from a second length of a second TTI associated with a second pathloss mode. The operations of 2105 may be performed according to the methods described herein. In some examples, aspects of the operations of 2105 may be performed by a first pathloss link manager as described with reference to FIGS. 10-14.

At 2110, the UE or base station may communicate with a second wireless device in the first pathloss mode using a communication link via the one or more sets of resources. The operations of 2110 may be performed according to the methods described herein. In some examples, aspects of the operations of 2110 may be performed by a first pathloss communicator as described with reference to FIGS. 10-14.

At 2115, the UE or base station may receive, from the second wireless device, an indication to switch from the first pathloss mode to the second pathloss mode. The operations of 2115 may be performed according to the methods described herein. In some examples, aspects of the operations of 2115 may be performed by an indication receiver as described with reference to FIGS. 10-14.

At 2120, the UE or base station may configure one or more second sets of resources of the radio frequency spectrum band for communications associated with the second pathloss mode. The operations of 2120 may be performed according to the methods described herein. In some examples, aspects of the operations of 2120 may be performed by a second pathloss link manager as described with reference to FIGS. 10-14.

At 2125, the UE or base station may communicate with the second wireless device in the second pathloss mode using a second communication link via the one or more second sets of resources. The operations of 2125 may be performed according to the methods described herein. In some examples, aspects of the operations of 2125 may be performed by a second pathloss communicator as described with reference to FIGS. 10-14.

At 2130, the UE or base station may communicate with the second wireless device in the second pathloss mode based on the indication. The operations of 2130 may be performed according to the methods described herein. In some examples, aspects of the operations of 2130 may be performed by a second pathloss communicator as described with reference to FIGS. 10-14.

It should be noted that the methods described herein describe possible implementations, and that the operations and the steps may be rearranged or otherwise modified and that other implementations are possible. Further, aspects from two or more of the methods may be combined.

Example 1: A method for wireless communications at a first wireless device, comprising: configuring one or more first sets of resources of a radio frequency spectrum band for communications associated with a first mode; configuring one or more second sets of resources of the radio frequency spectrum band for communications associated with a second mode, wherein a first length of a first transmission time interval associated with the first mode is different from a second length of a second transmission time interval associated with the second mode; communicating with a second wireless device operating in the first mode via the one or more first sets of resources; and communicating with a third wireless device operating in the second mode via the one or more second sets of resources.

Example 2: The method of example 1, wherein the first mode is a first pathloss mode and the second mode is a second pathloss mode.

Example 3: The method of example 2, wherein the first pathloss mode is a high pathloss mode and the second pathloss mode is a normal mode.

Example 4: The method of examples 1 to 3, wherein the first, second, and third wireless devices are integrated access and backhaul (IAB) nodes operating in an IAB network.

Example 5: The method of examples 1 to 4, further comprising: configuring a first subset of a set of communication links supported by the first wireless device for the first mode; and configuring a second subset of the set of communication links supported by the first wireless device for the second mode.

Example 6: The method of example 5, further comprising: identifying a pathloss associated with the first subset of the set of communication links, wherein the first subset of the set of communication links is configured based at least in part on the identified pathloss.

Example 7: The method of examples 1 to 6, wherein: the one or more first sets of resources are associated with one or more first sets of time resources and one or more first sets of frequency resources; and the one or more second sets of resources are associated with at least a portion of the one or more first sets of time resources and one or more second sets of frequency resources different from the one or more first sets of frequency resources.

Example 8: The method of examples 1 to 7, wherein: the one or more first sets of resources are associated with one or more first sets of time resources and one or more first sets of frequency resources; and the one or more second sets of resources are associated with one or more second sets of time resources different from the one or more first sets of time resources and at least a portion of the one or more first sets of frequency resources.

Example 9: The method of examples 1 to 8, wherein: the one or more first sets of resources are associated with one or more first sets of time resources and one or more first sets of frequency resources; and the one or more second sets of resources are associated with one or more second sets of time resources different from the one or more first sets of time resources and one or more second sets of frequency resources different from the one or more first sets of frequency resources.

Example 10: The method of examples 1 to 9, wherein the one or more first sets of resources and the one or more second sets of resources are the same.

Example 11: The method of example 10, further comprising: communicating with the second wireless device according to a first spatial stream; and communicating with the third wireless device according to a second spatial stream different from the first spatial stream.

Example 12: The method of examples 1 to 11, further comprising: communicating with the second wireless device operating in the first mode via a first communication link associated with the one or more first sets of resources, wherein the first communication link is configured for one of transmission or reception; and communicating with the third wireless device operating in the second mode via a second communication link associated with the one or more second sets of resources, wherein the second communication link is configured for one of transmission or reception independent of the first communication link.

Example 13: The method of examples 1 to 12, further comprising: configuring a set of gaps for communications of the first mode via the one or more first sets of resources; configuring a set of transmission time intervals for communications of the second mode via the one or more second sets of resources; and synchronizing the set of gaps corresponding to the first mode with the set of transmission time intervals corresponding to the second mode.

Example 14: The method of example 13, further comprising: transmitting a gap structure associated with the set of gaps, wherein the gap structure indicates respective locations and lengths corresponding to the set of gaps.

Example 15: The method of examples 13 or 14, further comprising: transmitting the gap structure via a slot format indicator.

Example 16: The method of example 13, further comprising: configuring a first set of gaps, a first set of transmission time intervals associated with transmission, and a first set of transmission time intervals associated with reception for communications of the first mode via the one or more first sets of resources; configuring a second set of gaps, a second set of transmission time intervals associated with transmission, and a second set of transmission time intervals associated with reception for communications of the second mode via the one or more second sets of resources; and synchronizing the first and the second sets of gaps, the first and the second sets of transmission time intervals associated with transmission, and the first and the second sets of transmission time intervals associated with reception.

Example 17: The method of examples 13 or 16, further comprising: transmitting a gap structure indicating respective locations and lengths for one or more gaps of the first set of gaps or the second set of gaps, or both.

Example 18: A method for wireless communications at a first wireless device, comprising: configuring one or more sets of resources of a radio frequency spectrum band for communications associated with a first mode, wherein a first length of a first transmission time interval associated with the first mode is different from a second length of a second transmission time interval associated with a second mode; and communicating with a second wireless device in the first mode using a communication link via the one or more sets of resources.

Example 19: The method of example 18, wherein the first mode is a first pathloss mode and the second mode is a second pathloss mode.

Example 20: The method of examples 18 or 19, further comprising: configuring one or more second sets of resources of the radio frequency spectrum band for communications associated with the second mode; and communicating with the second wireless device in the second mode using a second communication link via the one or more second sets of resources.

Example 21: The method of example 20, further comprising: receiving, from the second wireless device, an indication to switch from the first mode to the second mode; and communicating with the second wireless device in the second mode based at least in part on the indication.

Example 22: The method of example 20, wherein: the one or more first sets of resources are associated with one or more first sets of time resources and one or more first sets of frequency resources; and the one or more second sets of resources are associated with at least a portion of the one or more first sets of time resources and one or more second sets of frequency resources different from the one or more first sets of frequency resources.

Example 23: The method of example 20, wherein: the one or more first sets of resources are associated with one or more first sets of time resources and one or more first sets of frequency resources; and the one or more second sets of resources are associated with one or more second sets of time resources different from the one or more first sets of time resources and at least a portion of the one or more first sets of frequency resources.

Example 24: The method of example 20, wherein: the one or more first sets of resources are associated with one or more first sets of time resources and one or more first sets of frequency resources; and the one or more second sets of resources are associated with one or more second sets of time resources different from the one or more first sets of time resources and one or more second sets of frequency resources different from the one or more first sets of frequency resources.

Example 25: The method of example 20, wherein the one or more first sets of resources and the one or more second sets of resources are the same.

Example 26: The method of example 20, further comprising: receiving, from the second wireless device, a gap structure associated with one or more gaps for the first mode, wherein the gap structure indicates respective locations and lengths corresponding to the one or more gaps; and communicating with the second wireless device based at least in part on the gap structure.

Example 27: The method of examples 20 or 26, further comprising: receiving the gap structure via a slot format indicator.

Example 28

An apparatus for wireless communications at a first wireless device, comprising: a processor; and memory coupled to the processor, the processor and memory configured to: configure one or more first sets of resources of a radio frequency spectrum band for communications associated with a first mode; configure one or more second sets of resources of the radio frequency spectrum band for communications associated with a second mode, wherein a first length of a first transmission time interval associated with the first mode is different from a second length of a second transmission time interval associated with the second mode; communicate with a second wireless device operating in the first mode via the one or more first sets of resources; and communicate with a third wireless device operating in the second mode via the one or more second sets of resources.

Example 29

An apparatus for wireless communications at a first wireless device, comprising: a processor; and memory coupled to the processor, the processor and memory configured to: configure one or more sets of resources of a radio frequency spectrum band for communications associated with a first mode, wherein a first length of a first transmission time interval associated with the first mode is different from a second length of a second transmission time interval associated with a second mode; and communicate with a second wireless device in the first mode using a communication link via the one or more sets of resources.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless device, comprising:
    configuring, at the first wireless device for communications with a second wireless device, one or more first sets of resources of a radio frequency spectrum band for communications associated with a first mode;
    configuring, at the first wireless device for communications with a third wireless device, one or more second sets of resources of the radio frequency spectrum band for communications associated with a second mode, wherein a first length of a first synchronization signal block associated with the first mode is different from a second length of a second synchronization signal block associated with the second mode;
    communicating, according to the first length of the first synchronization signal block, with the second wireless device operating in the first mode via the one or more first sets of resources; and
    communicating, according to the second length of the second synchronization signal block, with the third wireless device operating in the second mode via the one or more second sets of resources.

2. The method of claim 1, wherein the first mode is a first pathloss mode and the second mode is a second pathloss mode.

3. The method of claim 2, wherein the first pathloss mode is a high pathloss mode and the second pathloss mode is a normal mode.

4. The method of claim 1, wherein the first, second, and third wireless devices are integrated access and backhaul (IAB) nodes operating in an IAB network.

5. The method of claim 1, further comprising:
    configuring a first subset of a set of communication links supported by the first wireless device for the first mode; and
    configuring a second subset of the set of communication links supported by the first wireless device for the second mode.

6. The method of claim 5, further comprising:
    identifying a pathloss associated with the first subset of the set of communication links, wherein the first subset of the set of communication links is configured based at least in part on the identified pathloss.

7. The method of claim 1, wherein:
    the one or more first sets of resources are associated with one or more first sets of time resources and one or more first sets of frequency resources; and
    the one or more second sets of resources are associated with at least a portion of the one or more first sets of time resources and one or more second sets of frequency resources different from the one or more first sets of frequency resources.

8. The method of claim 1, wherein:
    the one or more first sets of resources are associated with one or more first sets of time resources and one or more first sets of frequency resources; and
    the one or more second sets of resources are associated with one or more second sets of time resources different from the one or more first sets of time resources and at least a portion of the one or more first sets of frequency resources.

9. The method of claim 1, wherein:
    the one or more first sets of resources are associated with one or more first sets of time resources and one or more first sets of frequency resources; and
    the one or more second sets of resources are associated with one or more second sets of time resources different from the one or more first sets of time resources and one or more second sets of frequency resources different from the one or more first sets of frequency resources.

10. The method of claim 1, wherein the one or more first sets of resources and the one or more second sets of resources are the same.

11. The method of claim 10, further comprising:
    communicating with the second wireless device according to a first spatial stream; and
    communicating with the third wireless device according to a second spatial stream different from the first spatial stream.

12. The method of claim 1, further comprising:
    communicating with the second wireless device operating in the first mode via a first communication link associated with the one or more first sets of resources, wherein the first communication link is configured for one of transmission or reception; and
    communicating with the third wireless device operating in the second mode via a second communication link associated with the one or more second sets of resources, wherein the second communication link is configured for one of transmission or reception independent of the first communication link.

13. The method of claim 1, further comprising:
configuring a set of gaps for communications of the first mode via the one or more first sets of resources;
configuring a set of transmission time intervals for communications of the second mode via the one or more second sets of resources; and
synchronizing the set of gaps corresponding to the first mode with the set of transmission time intervals corresponding to the second mode.

14. The method of claim 13, further comprising:
transmitting a gap structure associated with the set of gaps, wherein the gap structure indicates respective locations and lengths corresponding to the set of gaps.

15. The method of claim 14, further comprising:
transmitting the gap structure via a slot format indicator.

16. A method for wireless communications at a first wireless device, comprising:
configuring, at the first wireless device for communications with a second wireless device, one or more first sets of resources of a radio frequency spectrum band for communications associated with a first mode, wherein a first length of a first synchronization signal block associated with the first mode is different from a second length of a second synchronization signal block associated with a second mode; and
communicating, according to the first length of the first synchronization signal block, with the second wireless device in the first mode using a communication link via the one or more first sets of resources.

17. The method of claim 16, wherein the first mode is a first pathloss mode and the second mode is a second pathloss mode.

18. The method of claim 16, further comprising:
configuring one or more second sets of resources of the radio frequency spectrum band for communications associated with the second mode; and
communicating with the second wireless device in the second mode using a second communication link via the one or more second sets of resources.

19. The method of claim 18, further comprising:
receiving, from the second wireless device, an indication to switch from the first mode to the second mode; and
communicating with the second wireless device in the second mode based at least in part on the indication.

20. The method of claim 18, wherein:
the one or more first sets of resources are associated with one or more first sets of time resources and one or more first sets of frequency resources; and
the one or more second sets of resources are associated with at least a portion of the one or more first sets of time resources and one or more second sets of frequency resources different from the one or more first sets of frequency resources.

21. The method of claim 18, wherein:
the one or more first sets of resources are associated with one or more first sets of time resources and one or more first sets of frequency resources; and
the one or more second sets of resources are associated with one or more second sets of time resources different from the one or more first sets of time resources and at least a portion of the one or more first sets of frequency resources.

22. The method of claim 18, wherein:
the one or more first sets of resources are associated with one or more first sets of time resources and one or more first sets of frequency resources; and
the one or more second sets of resources are associated with one or more second sets of time resources different from the one or more first sets of time resources and one or more second sets of frequency resources different from the one or more first sets of frequency resources.

23. The method of claim 18, wherein the one or more first sets of resources and the one or more second sets of resources are the same.

24. The method of claim 18, further comprising:
receiving, from the second wireless device, a gap structure associated with one or more gaps for the first mode, wherein the gap structure indicates respective locations and lengths corresponding to the one or more gaps; and
communicating with the second wireless device based at least in part on the gap structure.

25. The method of claim 24, further comprising:
receiving the gap structure via a slot format indicator.

26. An apparatus for wireless communications at a first wireless device, comprising:
a processor; and
memory coupled to the processor, the processor configured to:
configure, at the first wireless device for communications with a second wireless device, one or more first sets of resources of a radio frequency spectrum band for communications associated with a first mode;
configure, at the first wireless device for communications with a third wireless device, one or more second sets of resources of the radio frequency spectrum band for communications associated with a second mode, wherein a first length of a first synchronization signal block associated with the first mode is different from a second length of a second synchronization signal block associated with the second mode;
communicate, according to the first length of the first synchronization signal block, with the second wireless device operating in the first mode via the one or more first sets of resources; and
communicate, according to the second length of the second synchronization signal block, with the third wireless device operating in the second mode via the one or more second sets of resources.

27. The apparatus of claim 26, wherein the first mode is a first pathloss mode and the second mode is a second pathloss mode.

28. The apparatus of claim 27, wherein the first pathloss mode is a high pathloss mode and the second pathloss mode is a normal mode.

29. The apparatus of claim 26, wherein the processor is further configured to:
configure a first subset of a set of communication links supported by the first wireless device for the first mode; and
configure a second subset of the set of communication links supported by the first wireless device for the second mode.

30. An apparatus for wireless communications at a first wireless device, comprising:
a processor; and
memory coupled to the processor, the processor configured to:

configure, at the first wireless device for communications with a second wireless device, one or more first sets of resources of a radio frequency spectrum band for communications associated with a first mode, wherein a first length of a first synchronization signal block associated with the first mode is different from a second length of a second synchronization signal block associated with a second mode; and communicate, according to the first length of the first synchronization signal block, with the second wireless device in the first mode using a communication link via the one or more first sets of resources.

31. The apparatus of claim 30, wherein the first mode is a first pathloss mode and the second mode is a second pathloss mode.

32. The apparatus of claim 30, wherein the processor is further configured to:

configure one or more second sets of resources of the radio frequency spectrum band for communications associated with the second mode; and communicate with the second wireless device in the second mode using a second communication link via the one or more second sets of resources.

33. The apparatus of claim 32, wherein the processor is further configured to:

receive, from the second wireless device, an indication to switch from the first mode to the second mode; and communicate with the second wireless device in the second mode based at least in part on the indication.

34. An apparatus for wireless communications at a first wireless device, comprising:

means for configuring, at the first wireless device for communications with a second wireless device, one or more first sets of resources of a radio frequency spectrum band for communications associated with a first mode;

means for configuring, at the first wireless device for communications with a third wireless device, one or more second sets of resources of the radio frequency spectrum band for communications associated with a second mode, wherein a first length of a first synchronization signal block associated with the first mode is different from a second length of a second synchronization signal block associated with the second mode;

means for communicating, according to the first length of the first synchronization signal block, with the second wireless device operating in the first mode via the one or more first sets of resources; and means for communicating, according to the second length of the second synchronization signal block, with the third wireless device operating in the second mode via the one or more second sets of resources.

35. The apparatus of claim 34, wherein the first mode is a first pathloss mode and the second mode is a second pathloss mode.

36. The apparatus of claim 35, wherein the first pathloss mode is a high pathloss mode and the second pathloss mode is a normal mode.

37. The apparatus of claim 34, further comprising:

means for configuring a first subset of a set of communication links supported by the first wireless device for the first mode; and means for configuring a second subset of the set of communication links supported by the first wireless device for the second mode.

38. An apparatus for wireless communications at a first wireless device, comprising:

means for configuring, at the first wireless device for communications with a second wireless device, one or more first sets of resources of a radio frequency spectrum band for communications associated with a first mode, wherein a first length of a first synchronization signal block associated with the first mode is different from a second length of a second synchronization signal block associated with a second mode; and means for communicating, according to the first length of the first synchronization signal block, with the second wireless device in the first mode using a communication link via the one or more first sets of resources.

39. The apparatus of claim 38, wherein the first mode is a first pathloss mode and the second mode is a second pathloss mode.

40. The apparatus of claim 38, further comprising:

means for configuring one or more second sets of resources of the radio frequency spectrum band for communications associated with the second mode; and means for communicating with the second wireless device in the second mode using a second communication link via the one or more second sets of resources.

41. A non-transitory computer-readable medium storing code for wireless communications at a first wireless device, the code comprising instructions executable by a processor to:

configure, at the first wireless device for communications with a second wireless device, one or more first sets of resources of a radio frequency spectrum band for communications associated with a first mode;

configure, at the first wireless device for communications with a third wireless device, one or more second sets of resources of the radio frequency spectrum band for communications associated with a second mode, wherein a first length of a first synchronization signal block associated with the first mode is different from a second length of a second synchronization signal block associated with the second mode;

communicate, according to the first length of the first synchronization signal block, with the second wireless device operating in the first mode via the one or more first sets of resources; and communicate, according to the second length of the second synchronization signal block, with the third wireless device operating in the second mode via the one or more second sets of resources.

42. The non-transitory computer-readable medium of claim 41, wherein the first mode is a first pathloss mode and the second mode is a second pathloss mode.

43. The non-transitory computer-readable medium of claim 42, wherein the first pathloss mode is a high pathloss mode and the second pathloss mode is a normal mode.

44. The non-transitory computer-readable medium of claim 41, wherein the instructions are further executable by the processor to:

configure a first subset of a set of communication links supported by the first wireless device for the first mode; and configure a second subset of the set of communication links supported by the first wireless device for the second mode.

45. A non-transitory computer-readable medium storing code for wireless communications at a first wireless device, the code comprising instructions executable by a processor to:

configure, at the first wireless device for communications with a second wireless device, one or more first sets of resources of a radio frequency spectrum band for communications associated with a first mode, wherein a first length of a first synchronization signal block associated with the first mode is different from a second length of a second synchronization signal block associated with a second mode; and communicate, according to the first length of the first synchronization signal block, with the second wireless device in the first mode using a communication link via the one or more first sets of resources.

46. The non-transitory computer-readable medium of claim 45, wherein the first mode is a first pathloss mode and the second mode is a second pathloss mode.

47. The non-transitory computer-readable medium of claim 45, wherein the instructions are further executable by the processor to:

configure one or more second sets of resources of the radio frequency spectrum band for communications associated with the second mode; and communicate with the second wireless device in the second mode using a second communication link via the one or more second sets of resources.

* * * * *